United States Patent
Kojima

(10) Patent No.: US 12,461,535 B2
(45) Date of Patent: Nov. 4, 2025

(54) POSITIONING APPARATUS CAPABLE OF MEASURING POSITION OF MOVING BODY USING IMAGE CAPTURING APPARATUS

(71) Applicant: Panasonic Intellectual Property Management Co., Ltd., Osaka (JP)

(72) Inventor: Takumi Kojima, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 545 days.

(21) Appl. No.: 17/349,178

(22) Filed: Jun. 16, 2021

(65) Prior Publication Data
US 2021/0312661 A1  Oct. 7, 2021

Related U.S. Application Data

(63) Continuation of application No. PCT/JP2019/046185, filed on Nov. 26, 2019.

(30) Foreign Application Priority Data

Dec. 28, 2018  (JP) .................................. 2018-247829

(51) Int. Cl.
*G05D 1/00*  (2024.01)
*G06T 7/73*  (2017.01)
(Continued)

(52) U.S. Cl.
CPC ............. *G05D 1/0274* (2013.01); *G06T 7/74* (2017.01); *G06V 10/44* (2022.01); *G06V 10/457* (2022.01);
(Continued)

(58) Field of Classification Search
None
See application file for complete search history.

(56) References Cited

U.S. PATENT DOCUMENTS

| 8,196,835 B2 * | 6/2012 | Emanuel .................. G01S 5/16 |
| | | 235/472.01 |
| 10,268,924 B2 * | 4/2019 | Gu .......................... G01N 23/04 |

(Continued)

FOREIGN PATENT DOCUMENTS

| EP | 1 870 856 | 12/2007 |
| EP | 3 308 911 | 4/2018 |

(Continued)

OTHER PUBLICATIONS

Herman, Edwin, and Gilbert Strang. "Calculus Volume 3." (2016). pp 177-178. https://openstax.org/details/books/calculus-volumr-3/. (Year: 2016).*

(Continued)

*Primary Examiner* — Matthew C Bella
*Assistant Examiner* — Johnny B Duong
(74) *Attorney, Agent, or Firm* — Wenderoth, Lind & Ponack, L.L.P.

(57) ABSTRACT

A first calculator calculates relative position and attitude of a vehicle based on images captured by an image capturing apparatus on the vehicle. A second calculator extracts one marker from a captured image, calculates absolute position and attitude of the vehicle based on a position and an attitude of the one extracted marker, and calculates an angle of a direction of the vehicle 1 with respect to a normal line to a plane of the one marker 4 based on a position and an attitude of the vehicle 1 in a marker coordinate system. A corrector generates a corrected position and attitude, not using the absolute position and attitude calculated based on the marker for which the angle is not larger than a first threshold, but using the absolute position and attitude calculated based on the marker for which the angle is larger than the first threshold.

16 Claims, 18 Drawing Sheets

(51) Int. Cl.
　　　*G06V 10/44*　　(2022.01)
　　　*G06V 10/46*　　(2022.01)
　　　*G06V 20/56*　　(2022.01)
　　　*G06V 40/10*　　(2022.01)
(52) U.S. Cl.
　　　CPC ............ *G06V 10/462* (2022.01); *G06V 20/56* (2022.01); *G06V 20/588* (2022.01); *G06V 40/10* (2022.01); *G06T 2207/30196* (2013.01); *G06T 2207/30204* (2013.01); *G06T 2207/30252* (2013.01)

(56) References Cited

U.S. PATENT DOCUMENTS

| | | | |
|---|---|---|---|
| 2006/0184013 A1* | 8/2006 | Emanuel | G01S 5/16 600/426 |
| 2015/0213617 A1 | 7/2015 | Kim et al. | |
| 2016/0364912 A1 | 12/2016 | Cho et al. | |
| 2019/0039473 A1 | 2/2019 | Takehara et al. | |
| 2019/0072975 A1 | 3/2019 | Choi | |

FOREIGN PATENT DOCUMENTS

| | | |
|---|---|---|
| JP | 2003-281676 | 10/2003 |
| JP | 2011-219229 | 11/2011 |
| JP | 2012-48643 | 3/2012 |
| JP | 2013-235351 | 11/2013 |
| JP | 2017-139941 | 8/2017 |
| JP | 3 308 911 | 4/2018 |
| WO | 2018/179960 | 10/2018 |

OTHER PUBLICATIONS

Glibin, E. S., et al. "Method of Mobile Robot Indoor Navigation by Artificial Landmarks with Use of Computer Vision." Journal of Physics: Conference Series, vol. 1015, No. 3, May 2018, p. 032171. Institute of Physics, https://doi.org/10.1088/1742-6596/1015/3/032171. (Year: 2018).*

Khude, P. S., and S. S. Pawar. "Object Detection, Tracking and Counting Using Enhanced BMA on Static Background Videos." 2013 IEEE International Conference on Computational Intelligence and Computing Research, 2013, pp. 1-4. IEEE Xplore, https://doi.org/10.1109/ICCIC.2013.6724236. (Year: 2013).*

Liu, Yanling, and Zhenhua Liu. "An Optimized Method for Dynamic Measurement of Truck Loading Capacity." 2018 3rd IEEE International Conference on Intelligent Transportation Engineering (ICITE), IEEE, 2018, pp. 120-124. DOI.org (Crossref), https://doi.org/10.1109/ICITE.2018.8492669. (Year: 2018).*

Charalampous, Konstantinos, et al. "Robot Navigation in Large-Scale Social Maps: An Action Recognition Approach." Expert Systems with Applications, vol. 66, Dec. 2016, pp. 261-273. DOI.org (Crossref), https://doi.org/10.1016/j.eswa.2016.09.026. (Year: 2016).*

Frintrop, Simone, and Patric Jensfelt. "Attentional landmarks and active gaze control for visual SLAM." IEEE Transactions on Robotics 24.5 (2008): 1054-1065. (Year: 2008).*

Lamberti, Fabrizio, et al. "Mixed marker-based/marker-less visual odometry system for mobile robots." International Journal of Advanced Robotic Systems 10.5 (2013): 260. (Year: 2013).*

Herman, Edwin, and Gilbert Strang. "Calculus Volume 3." (2016). pp 177-178. https://openstax.org/details/books/calculus-volume-3/. (Year: 2016).*

Neunert, Michael, Michael Bloesch, and Jonas Buchli. "An open source, fiducial based, visual-inertial motion capture system." 2016 19th International Conference on Information Fusion (FUSION). IEEE, 2016. (Year: 2016).*

International Search Report issued Feb. 18, 2020 in International (PCT) Application No. PCT/JP2019/046185.

R. Mur-Artal et al., "ORB-SLAM2: an Open-Source SLAM System for Monocular, Stereo and RGB-D Cameras", IEEE Transactions on Robotics, vol. 33, Issue: 5, Oct. 2016.

English Translation of International Preliminary Report on Patentability issued Jul. 1, 2021 International (PCT) Application No. PCT/JP2019/046185.

Partial Supplementary European Search Report issued Jan. 27, 2022 in corresponding International (PCT) Patent Application No. 19903677.3.

Extended European Search Report issued Apr. 29, 2022 in corresponding European Patent Application No. 19903677.3.

\* cited by examiner

Fig. 4
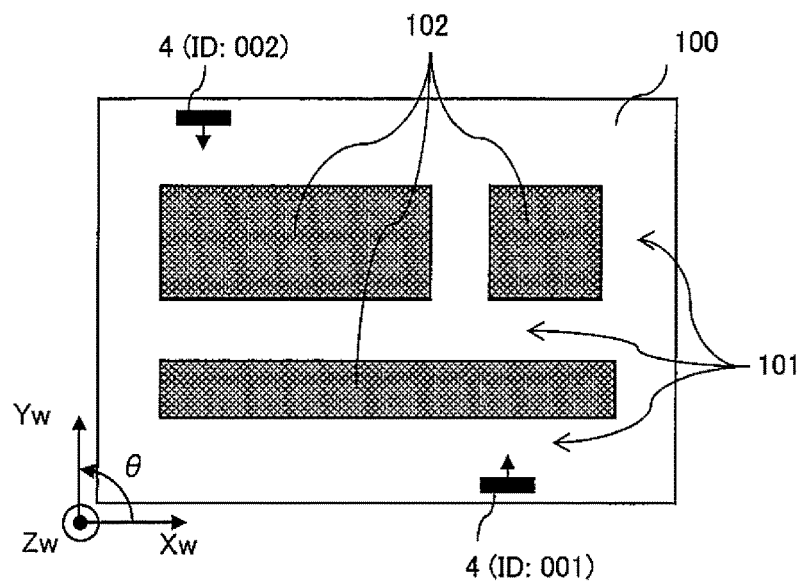
Fig. 5
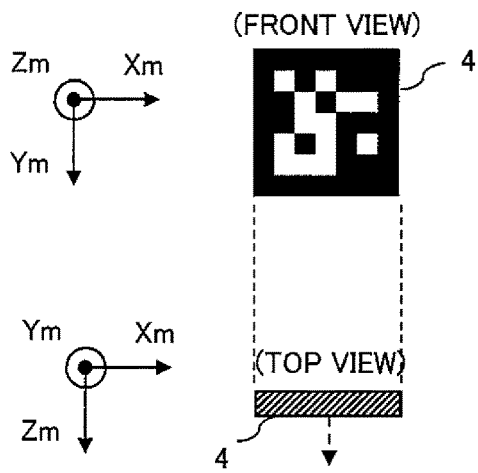
Fig. 6
| ID | POSITION Xw [m] | POSITION Yw [m] | POSITION Zw [m] | ANGLE θ [rad] | SIZE [m] |
|---|---|---|---|---|---|
| 001 | 50 | 5 | 1 | $\pi/2$ | 0.30 |
| 002 | 10 | 30 | 1 | $3\pi/2$ | 0.30 |

| | ID | DATE AND TIME | POSITION Xw [m] | POSITION Yw [m] | POSITION Zw [m] | ANGLE [DEGREE] |
|---|---|---|---|---|---|---|
| | 010 | 2018/01/31 09:13:40:133 | 227.78 | 120.812 | 0.673 | 185.576 |
| | 010 | 2018/01/31 09:13:40:199 | 227.854 | 120.952 | 0.75 | 187.25 |
| | 010 | 2018/01/31 09:13:40:266 | 228.07 | 120.766 | 0.743 | 184.844 |
| | 010 | 2018/01/31 09:13:40:333 | 228.314 | 120.911 | 0.783 | 185.487 |
| | 010 | 2018/01/31 09:13:40:399 | 228.517 | 120.997 | 0.705 | 186.235 |
| ERRONEOUS DETECTION → | 668 | 2018/01/31 09:13:40:466 | 233.91 | 559.339 | 3.559 | 73.167 |
| | 010 | 2018/01/31 09:13:40:533 | 229.079 | 120.908 | 0.557 | 185.23 |
| | 010 | 2018/01/31 09:13:40:599 | 229.081 | 120.982 | 0.705 | 185.425 |
| | 010 | 2018/01/31 09:13:40:666 | 229.419 | 121.038 | 0.601 | 184.828 |

Fig. 23
| | ID | DATE AND TIME | POSITION Xm [m] | POSITION Ym [m] | POSITION Zm [m] | ANGLE [DEGREE] |
|---|---|---|---|---|---|---|
| | 011 | 2018/01/31 09:13:40:133 | 2.78 | 0.62 | 1.673 | 185.576 |
| | 011 | 2018/01/31 09:13:40:199 | 2.854 | 0.62 | 1.75 | 187.25 |
| INVERSION OF POSITION → | 011 | 2018/01/31 09:13:40:266 | -2.07 | 0.56 | 1.743 | 184.844 |
| | 011 | 2018/01/31 09:13:40:333 | 2.314 | 0.611 | 1.783 | 185.487 |
| | 011 | 2018/01/31 09:13:40:599 | 2.081 | 0.582 | 1.705 | 185.425 |
| | 011 | 2018/01/31 09:13:40:666 | 2.419 | 0..638 | 1.601 | 184.828 |
Fig. 24
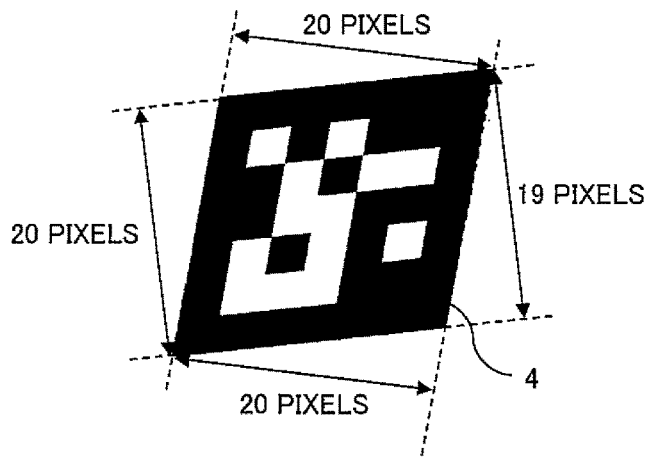
Fig. 25
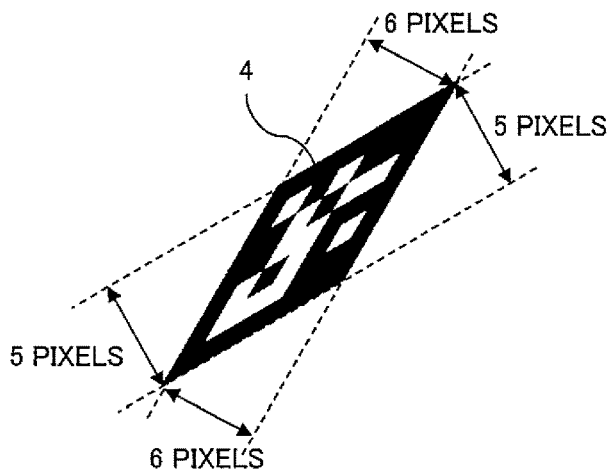

POSITIONING APPARATUS CAPABLE OF MEASURING POSITION OF MOVING BODY USING IMAGE CAPTURING APPARATUS

This is a continuation application of International Application No. PCT/JP2019/046185, with an international filing date of Nov. 26, 2019, which claims priority of Japanese patent application No. 2018-247829 filed on Dec. 28, 2018, the content of which is incorporated herein by reference.

BACKGROUND

1. Technical Field

The present disclosure relates to a positioning apparatus for measuring a position of a moving body, such as a vehicle, and a moving body including such a positioning apparatus.

2. Description of Related Art

When moving cargo within a predetermined area or between predetermined points using a cargo transporting vehicle, it may be required to measure and track a position of the vehicle. For example, Japanese Patent Laid-open Publication No. JP 2011-219229 A discloses a cargo location management device for measuring a position of a vehicle using a positioning technology, such as GPS, wireless LAN positioning, and infrared positioning.

When measuring a position of a vehicle moving outdoors, GPS positioning is typically used. On the other hand, radio waves from GPS satellites can not be received indoors, e.g., inside a warehouse and a factory, etc., and therefore, GPS positioning can not be used. Examples of indoor positioning methods include a method using wireless signals of, for example, ultra wide band (UWB), Wi-Fi, or Bluetooth (registered trademark) Low Energy (BLE), etc. However, the positioning method using wireless signals requires that the a large number of wireless transmitters for transmitting wireless signals are disposed in a moving area of the vehicle, thus requiring high initial costs. In addition, there is an indoor positioning method, called Pedestrian Dead Reckoning (PDR). However, it is difficult to accurately measure positions using the PDR.

For example, there is a technology called Visual Simultaneous Localization and Mapping (Visual-SLAM) as disclosed in R. Mur-Artal, et al., "ORB-SLAM2: an Open-Source SLAM System for Monocular, Stereo and RGB-D Cameras", IEEE Transactions on Robotics, Volume: 33, Issue: 5, October 2017, for accurately measuring and tracking a position of a moving body, such as a vehicle, without requiring a large number of wireless transmitters for transmitting wireless signals. According to Visual-SLAM, a moving body provided with an image capturing apparatus moves and captures images around the moving body, and then, an amount of movement of the moving body is calculated based on amounts of movement of feature points in the captured images. Thus, it is possible to estimate a current position of the moving body, and generate a map based on a trajectory of the moving body.

SUMMARY

In a situation where a background varies day by day, such as in a factory and a warehouse, it is difficult to determine a current position using a map created in advance. In this case, a position of a moving body obtained by the Visual-SLAM is calculated as a relative position with respect to a reference position (for example, a start position from which the moving body travels), and therefore, an error cumulatively increases with a lapse of time. Hence, there is a demand for a positioning apparatus capable of measuring a position of a moving body using an image capturing apparatus, with a smaller error than that of the prior art.

One non-limiting and exemplary embodiment provides a positioning apparatus capable of measuring a position of a moving body using an image capturing apparatus, with a smaller error than that of the prior art.

According to an aspect of the present disclosure, a positioning apparatus is provided with a first calculator, a storage apparatus, a second calculator, and a corrector. The first calculator calculates a first position and a first attitude of a moving body indicating a relative position and a relative attitude of the moving body with respect to a reference position and a reference attitude, based on a plurality of images captured by an image capturing apparatus mounted on the moving body. The storage apparatus stores information on identifiers, positions, and attitudes of a plurality of markers disposed at predetermined positions and visually distinguishable from each other, and information on a map containing a passageway for the moving body. The second calculator extracts one of the plurality of markers from an image captured by the image capturing apparatus, calculates a second position and a second attitude of the moving body indicating a position and an attitude of the moving body in the map, based on a position and an attitude of the one extracted marker, and calculates an angle of a direction of the moving body with respect to a normal line to a plane of the one marker, based on a position and an attitude of the moving body in a marker coordinate system with an origin at the one marker. The corrector corrects the first position and the first attitude based on the second position and the second attitude to generate a corrected position and a corrected attitude of the moving body. The corrector generates the corrected position and the corrected attitude, not using the second position and the second attitude calculated based on the position and the attitude of the marker for which the angle is not larger than a first threshold, but using the second position and the second attitude calculated based on the position and the attitude of the marker for which the angle is larger than the first threshold.

These general and specific aspects may be achieved by a system, a method, a computer program, and any combination of the system, the method, and the computer program.

Additional benefits and advantages of the disclosed embodiments will be apparent from the specification and Figures. The benefits and/or advantages may be individually provided by the various embodiments and features of the specification and drawings disclosure, and need not all be provided in order to obtain one or more of the same.

According to the one aspect of the present disclosure, it is possible to accurately measure the position and the attitude of the moving body, by correcting the first position and the first attitude based on the second position and the second attitude. In addition, according to the one aspect of the present disclosure, it is possible to more accurately measure the position and attitude of the moving body, by determining whether or not a recognized marker is reliable, and the position and attitude of the moving body based on the second position and the second attitude only when the marker is reliable.

BRIEF DESCRIPTION OF DRAWINGS

FIG. 4 is a map of a warehouse 100 including passageways 101 through which the vehicle 1 of FIG. 1 travels.

FIG. 5 is a diagram showing an example of a marker 4 of FIG. 4.

FIG. 6 is a table showing an example of marker information stored in a storage apparatus 35 of FIG. 3.

FIG. 23 is a table showing changes in the position of the image capturing apparatus 11 in the marker coordinate systems, the position being calculated by a position calculator 34 of FIG. 3.

FIG. 24 is a diagram showing an example of an image of the marker 4 captured by the image capturing apparatus 11 of FIG. 1, the image having a width suitable to calculate the absolute position and the absolute attitude of the vehicle 1.

FIG. 25 is a diagram showing an example of an image of the marker 4 captured by the image capturing apparatus 11 of FIG. 1, the image not having a width suitable to calculate the absolute position and the absolute attitude of the vehicle 1.

DETAILED DESCRIPTION

Embodiments according to the present disclosure will hereinafter be described with reference to the drawings. Note that similar constituent elements in the following respective embodiments are given identical reference signs.

First Embodiment

With reference to FIGS. 1 to 24, a positioning apparatus according to a first embodiment, and a moving body provided with such a positioning apparatus will be described.
[Configuration of First Embodiment]
[Overall Configuration]

Figure 1:
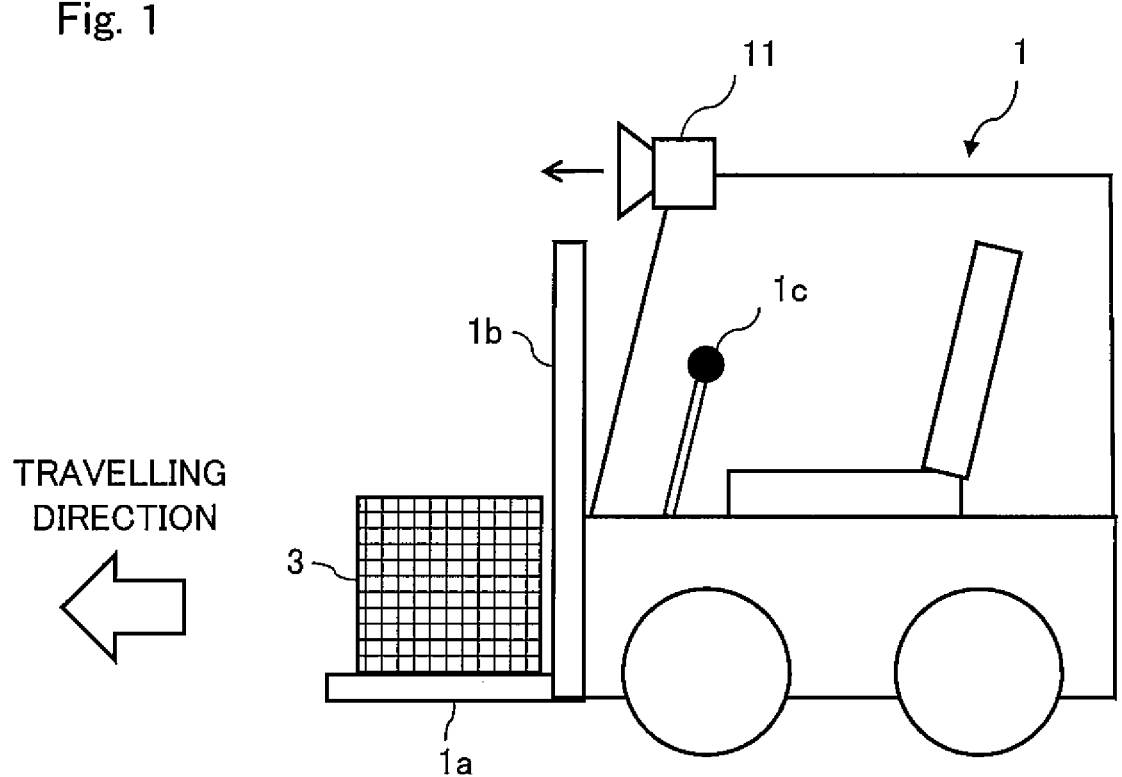
FIG. 1 is a schematic diagram showing a configuration of a vehicle 1 according to a first embodiment.

FIG. 1 is a schematic diagram showing a configuration of a vehicle 1 according to the first embodiment. The vehicle 1 may be a manned vehicle, such as a forklift or a truck. In addition, the vehicle 1 is provided with a cargo carrier 1a on which cargo 3 is carried. The vehicle 1 may be further provided with an elevating mechanism 1b for loading and unloading the cargo 3 on the cargo carrier 1a. In addition, the vehicle 1 is provided with a console 1c for receiving user operations, such as forward, backward, steering, and stop. In addition, on a body of the vehicle 1, an image capturing apparatus 11 is mounted for capturing images in a predetermined direction with respect to the vehicle 1 (forward, backward, side, upward, and/or downward directions).

Figure 2:
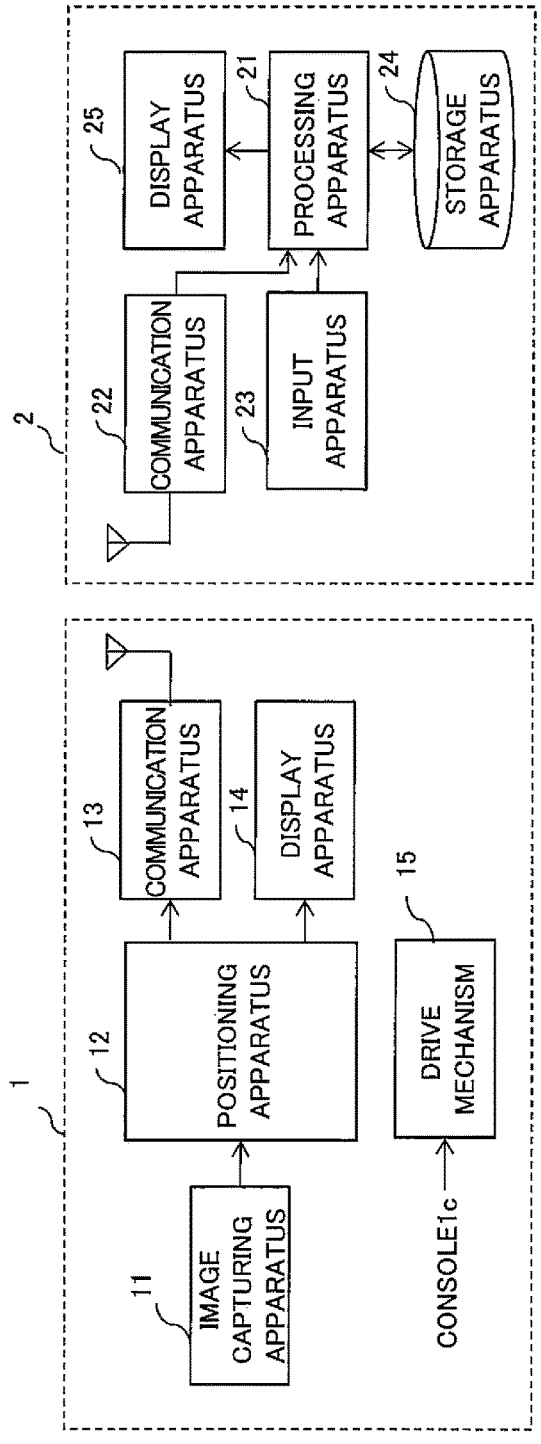
FIG. 2 is a block diagram showing a configuration of a positioning system including the vehicle 1 of FIG. 1.

FIG. 2 is a block diagram showing a configuration of a positioning system including the vehicle 1 of FIG. 1. The positioning system of FIG. 2 includes at least one vehicle 1 and a server apparatus 2. Each vehicle 1 includes a positioning apparatus 12 that measures a position of the vehicle 1 based on images captured by the image capturing apparatus 11. The server apparatus 2 obtains positions of the vehicles 1 from the vehicles 1, and records the positions of the vehicles 1.
[Configuration of Vehicle 1]

The vehicle 1 is provided with the image capturing apparatus 11, the positioning apparatus 12, a communication apparatus 13, a display apparatus 14, and a drive mechanism 15.

The image capturing apparatus 11 generates images of some object in a predetermined direction with respect to the vehicle 1, at certain time intervals, while the vehicle 1 is traveling. For example, the image capturing apparatus 11 includes at least one camera. The image capturing apparatus 11 may capture still images at certain time intervals, or may extract frames from a series of video frames at certain time intervals. The image capturing apparatus 11 sends the captured images to the positioning apparatus 12. The image capturing apparatus 11 provides each image with a timestamp of a time when the image is captured.

The positioning apparatus 12 measures the position of the vehicle 1 based on the images captured by the image capturing apparatus 11. The positioning apparatus 12 extracts feature points from the images captured by the image capturing apparatus 11, associates the extracted feature points among the images, and calculates a relative position and a relative attitude of the vehicle 1 with respect to a reference position and a reference attitude, based on changes of the feature points among the images. In addition, the positioning apparatus 12 extracts one of a plurality of markers disposed at predetermined positions and visually distinguishable from each other, from an image captured by the image capturing apparatus 11, and calculates an absolute position and an absolute attitude of the vehicle 1 in a map given in advance, based on the one extracted marker. The positioning apparatus 12 further corrects the relative position and the relative attitude based on the absolute position and the absolute attitude.

In the present specification, the "attitude" of the vehicle 1 indicates, for example, an angle of a traveling direction of the vehicle 1 with respect to a coordinate axe of a certain coordinate system ("world coordinate system" or "marker coordinate system" described below).

The communication apparatus 13 is provided with modules and control programs of Wi-Fi or Bluetooth, etc., to wirelessly communicate with the server apparatus 2. The communication apparatus 13 transmits the position and the attitude of the vehicle 1 calculated by the positioning apparatus 12, to the server apparatus 2.

The display apparatus 14 may display the position of the vehicle 1 on the map. In addition, the display apparatus 14 may display an alarm regarding an operation of the vehicle 1, and others.

The drive mechanism 15 includes an engine or a motor, a steering apparatus, a braking apparatus, and a control apparatus thereof, for the vehicle 1. The drive mechanism 15 is controlled, for example, through the console 1c by a user.

[Configuration of Server Apparatus 2]

The server apparatus 2 of FIG. 2 is provided with a processing apparatus 21, a communication apparatus 22, an input apparatus 23, a storage apparatus 24, and a display apparatus 25. The processing apparatus 21 is, for example, a general-purpose computer including a processor, a memory, and the like. The communication apparatus 22 is communicatively connected to the communication apparatus 13 of the vehicle(s) 1. The input apparatus 23 includes a keyboard, a pointing device, and the like. The storage apparatus 24 records the position and the attitude of the vehicle(s) 1 received from the vehicle(s) 1. The display apparatus 25 displays the position and the attitude of the vehicle(s) 1 received from the vehicle(s) 1. The processing apparatus 21 obtains the position of the vehicle(s) 1 from the vehicle(s) s 1 via the communication apparatus 22, records the position of the vehicle(s) 1 in the storage apparatus 24, and displays the position of the vehicle(s) 1 on the display apparatus 25.

The display apparatus 25 displays the position and the attitude of the vehicle 1 calculated by the positioning apparatus 12 of the vehicle 1. The processing apparatus 21 may obtain in advance a map of a movable range of the vehicle 1 (such as a warehouse or a factory), and display the position and the attitude of the vehicle 1 calculated by the positioning apparatus 12, on the display apparatus 25, such that the position and the attitude are overlaid on this map. Alternatively, the processing apparatus 21 itself may generate a map based on a travelling path of the vehicle 1, and display this map on the display apparatus 25.

[Configuration of Positioning Apparatus 12]

Figure 3:
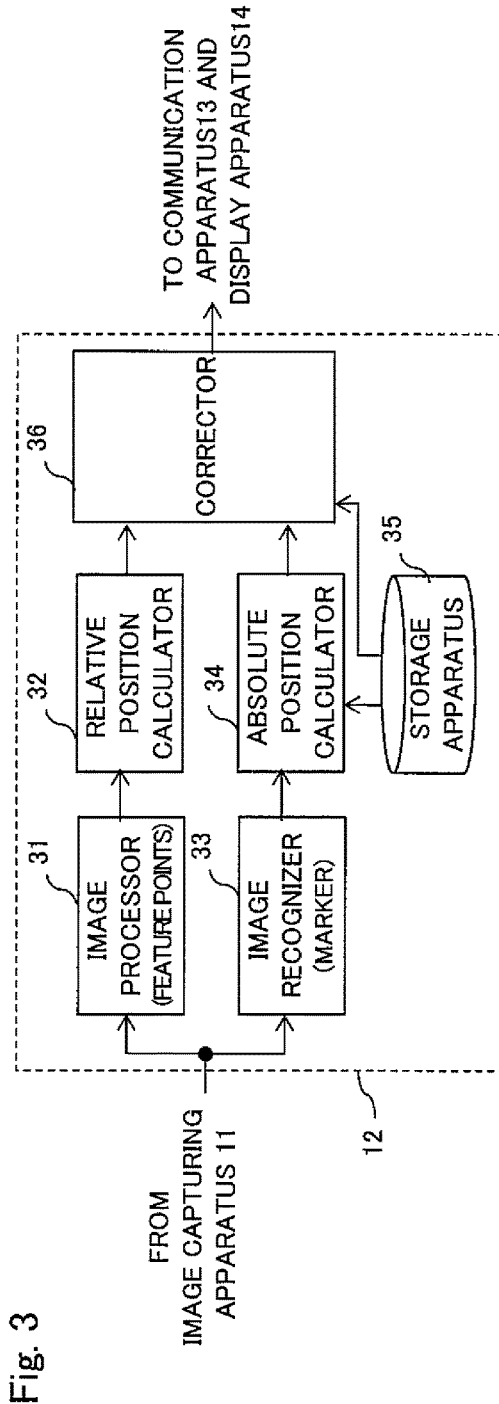
FIG. 3 is a block diagram showing a configuration of a positioning apparatus 12 of FIG. 2.

FIG. 3 is a block diagram showing a configuration of the positioning apparatus 12 of FIG. 2. The positioning apparatus 12 is provided with an image processor 31, a relative position calculator 32, an image recognizer 33, an absolute position calculator 34, a storage apparatus 35, and a corrector 36.

The storage apparatus 35 stores information on identifiers, positions, and attitudes of a plurality of markers 4 disposed at predetermined positions and visually distinguishable from each other, and information on a map including passageways for the vehicle 1 (for example, a map of the warehouse 100 described with reference to FIG. 4). The positions of the markers 4 may be represented as relative positions with respect to a reference position, and/or may be represented in association with the map.

FIG. 4 is a map of the warehouse 100 including passageways 101 through which the vehicle 1 of FIG. 1 travels. The warehouse 100 includes structures, such as a plurality of the passageways 101, and a plurality of shelves 102. The plurality of markers 4 are disposed in advance at a plurality of predetermined positions in the warehouse 100. The vehicle 1 of FIG. 1 travels through the passageways 101 to transport the cargo 3 from one of the shelves 102 to another one of the shelves 102. The positions of the vehicle 1 and the markers 4 are represented using a world coordinate system (Xw, Yw, Zw) determined for the entire warehouse 100.

FIG. 5 is a diagram showing an example of the marker 4 of FIG. 4. In the example of FIG. 5, the marker 4 is configured as a square flat plate. On one side of the marker 4, the marker 4 has a visually distinguishable pattern, into which an identifier of the marker 4 itself is encoded. In the example of FIG. 5, the marker 4 has a pattern constituted of 7×7 white or black square cells in the longitudinal and lateral directions. The pattern of the marker 4 is further configured such that the attitude of the marker 4 itself can be detected from an image of the marker 4, such as a marker used in a field of augmented reality (also referred to as a "AR marker"). Each marker 4 has a marker coordinate system (Xm, Ym, Zm) whose origin is located at an arbitrary point of the marker 4 (for example, center, or one vertex). In the lower part of FIG. 5 and other figures, a front surface of the marker 4 (positive direction of Zm axis) is indicated by an arrow at the center of a surface along an Xm-Ym plane.

FIG. 6 is a table showing an example of marker information stored in the storage apparatus 35 of FIG. 3. The example of FIG. 6 indicates information on the two markers 4 shown in FIG. 4. The markers 4 have identifiers 001 and 002, respectively. Each of the identifiers is encoded into the pattern of the corresponding marker 4. In addition, each of the markers 4 has certain coordinates in the world coordinate system (Xw, Yw, Zw). In addition, each of the markers 4 is disposed in such an attitude that the front surface (positive direction of Zm axis) of the marker 4 has an angle θ with respect to the Xw axis in an Xw-Yw plane (that is, azimuth angle). The attitude of each of the markers 4 may be represented by an azimuth angle and an elevation angle. In addition, each of the markers 4 has a size of 30 cm×30 cm.

The storage apparatus 35 stores marker information for all the markers 4, for example, including items shown in FIG. 6. In addition, the storage apparatus 35 also stores map information including directions, sizes, and arrangements of all the passageways 101.

Figure 7:
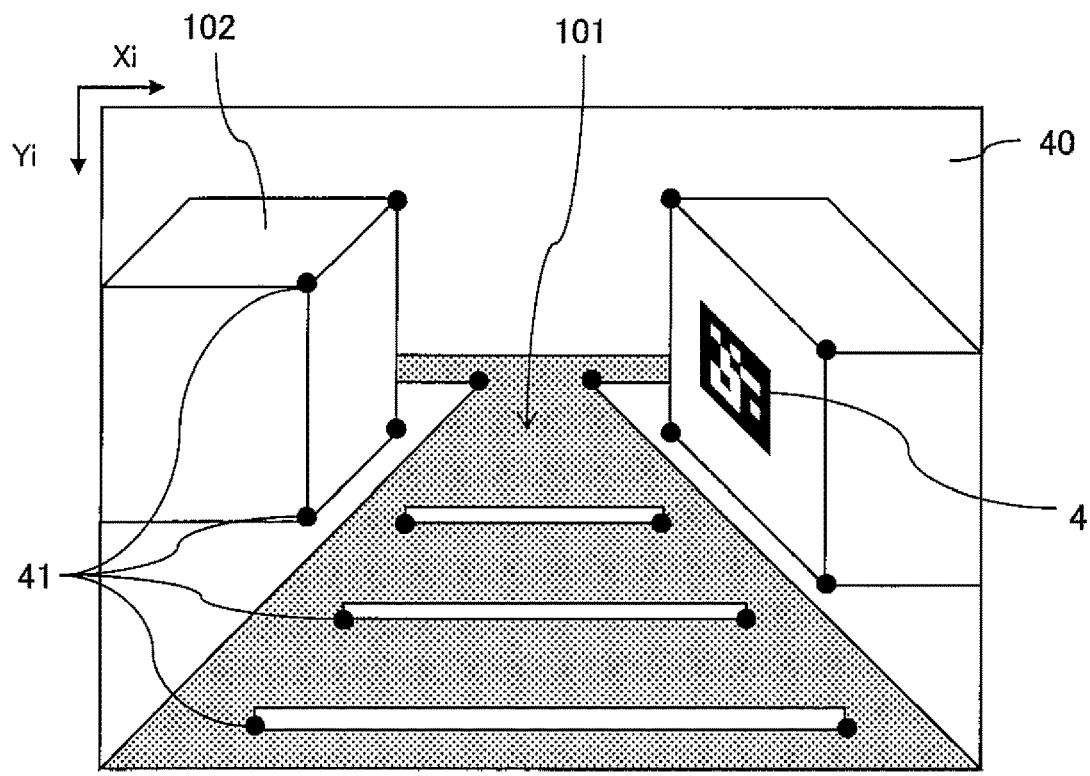
FIG. 7 is a diagram showing an example of an image 40 captured by an image capturing apparatus 11 of FIG. 1.

FIG. 7 is a diagram showing an example of the image 40 captured by the image capturing apparatus 11 of FIG. 1. The image 40 includes a plurality of feature points 41. Each of the feature points 41 is a point whose luminance or color is distinguishable from those of surrounding pixels, and whose position can be accurately determined. For example, each of the feature points 41 is detected from vertices or edges of structures, such as the passageways 101 or the shelves 102 through which the vehicle 1 travels, and detected from patterns on a floor, walls, or a ceiling. In addition, when the vehicle 1 passes near any one of the markers 4, the image 40 includes the corresponding marker 4. The positions of the feature points 41 and the marker 4 in the image 40 are represented by, for example, an image coordinate system (Xi, Yi) whose origin is located at any point in the image 40 (for example, upper left corner).

Again referring to FIG. 3, the image processor 31 extracts coordinates of the feature points corresponding to each other, from a plurality of images captured by the image capturing apparatus 11 at a plurality of time moments separated by a certain time length from each other. The relative position calculator 32 calculates an amount of movement of the vehicle 1 based on amounts of movement of the feature points in two images temporary adjacent to each other. Thus, the relative position calculator 32 calculates a relative position and a relative attitude of the vehicle 1 with respect to a reference position and a reference attitude (for example, a position and an attitude from which the vehicle 1 starts to travel), based on the coordinates of the feature points of the plurality of images. The relative position calculator 32 may calculate the relative position and the relative attitude of the vehicle 1 using known techniques for image processing and positioning, such as Visual-SLAM or Visual-Odometry. The reference position and the reference attitude are associated with the map information stored in the storage apparatus 35. In addition, the relative position calculator 32 provides the relative position and the relative attitude with a timestamp of an image associated with calculation of the relative position and the relative attitude (the latter of two images temporary adjacent to each other).

The relative position calculator 32 may represent the calculated position of the vehicle 1, for example, using Cartesian coordinates (XYZ coordinates). The relative position calculator 32 may calculate a velocity and/or an acceleration of the vehicle 1, based on the calculated position of the vehicle 1, and time. The relative position calculator 32 may represent the calculated attitude of the vehicle 1 as roll (left and right inclination), pitch (front and rear inclination), and yaw (rotation around an axis perpendicular to a floor surface (that is, the Zw axis in FIG. 4)). Thus, it is possible to represent not only a direction of the vehicle 1 in a horizontal plane parallel to the ground, but also an inclination of the body of the vehicle 1, and movement of the vehicle 1 in elevation.

In the present specification, the image processor 31 and the relative position calculator 32 are collectively referred to as a "first calculator". In addition, in the present specification, the relative position and relative attitude are referred to as a "first position" and a "first attitude", respectively.

The image recognizer 33 extracts one of the plurality of markers 4 disposed at predetermined positions and visually distinguishable from each other, from an image captured by the image capturing apparatus 11. The absolute position calculator 34 calculates the absolute position and the absolute attitude of the vehicle 1 indicating the position and the attitude of the vehicle 1 in the map (i.e., world coordinate system), by referring to the information on the markers 4 and the map information, both stored in the storage apparatus 35, based on the position and the attitude of the one extracted marker 4. In addition, the absolute position calculator 34 provides the absolute position and the absolute attitude with a timestamp of the image associated with calculation of the absolute position and the absolute attitude.

In the present specification, the image recognizer 33 and the absolute position calculator 34 are collectively referred to as a "second calculator". In addition, in the present specification, the absolute position and absolute attitude are referred to as a "second position" and a "second attitude", respectively.

The corrector 36 corrects the relative position and the relative attitude based on the absolute position and the absolute attitude to generate a corrected position and a corrected attitude of the vehicle 1. The corrector 36 synchronizes the absolute position and the absolute attitude with the relative position and the relative attitude, based on the timestamp of the relative position and the relative attitude, and based on the timestamp of the absolute position and the absolute attitude. The corrector 36 may consider the relative position and the relative attitude, and the absolute position and the absolute attitude, as positions and attitudes calculated from the same image, for example, when they have a time difference smaller than a predetermined threshold, and have timestamps closest to each other.

At least some of the components 31 to 36 of the positioning apparatus 12 may be integrated to each other. For example, the image processor 31 and the image recognizer 33 may be integrated to each other. In addition, the components 31 to 36 of the positioning apparatus 12 may be implemented as dedicated circuits, or as programs executed by a general-purpose processor.

[Operation of First Embodiment]

The corrector 36 corrects the relative position and the relative attitude calculated from on the feature points 41 using Visual-SLAM or the like, based on the absolute position and the absolute attitude calculated from on the marker 4, as described above. This correction process presupposes that the absolute position and the absolute attitude of the vehicle 1 are correct, and therefore, also presupposes that the attitude of the marker 4 is correctly recognized from the image capturing the marker 4. However, an object other than the marker 4 may be erroneously detected as the marker 4. In addition, in order to correctly recognize the attitude of the marker 4, it is necessary to capture the marker 4 at an appropriate angle and from an appropriate distance. When there is an error in the position and attitude of the marker 4 itself recognized from the image capturing the marker 4, an error also occurs in the absolute position and the absolute attitude of the vehicle 1. This may degrade the accuracy of the position and/or the attitude of the vehicle 1 calculated by the positioning apparatus 12.

Therefore, according to the positioning apparatus 12 of the first embodiment, the absolute position calculator 34 determines whether or not the marker 4 is captured at an appropriate angle and from an appropriate distance, in other words, whether or not the recognized marker 4 is reliable. Only when the marker 4 is reliable, the absolute position calculator 34 sends the absolute position and the absolute attitude of the vehicle 1 calculated based on the position and attitude of the marker 4, to the corrector 36. As a result, the corrector 36 corrects the position and attitude of the vehicle 1 based on the absolute position and the absolute attitude, only when the marker 4 is reliable. Thus, it is possible to properly correct the position and attitude of the vehicle 1 based on the correctly recognized position and attitude of the marker 4, and therefore, it is possible to accuracy measure the position and attitude of the vehicle 1.

Next, an operation of the positioning apparatus 12 will be described in detail.

[Overall Positioning Process]

Figure 8:
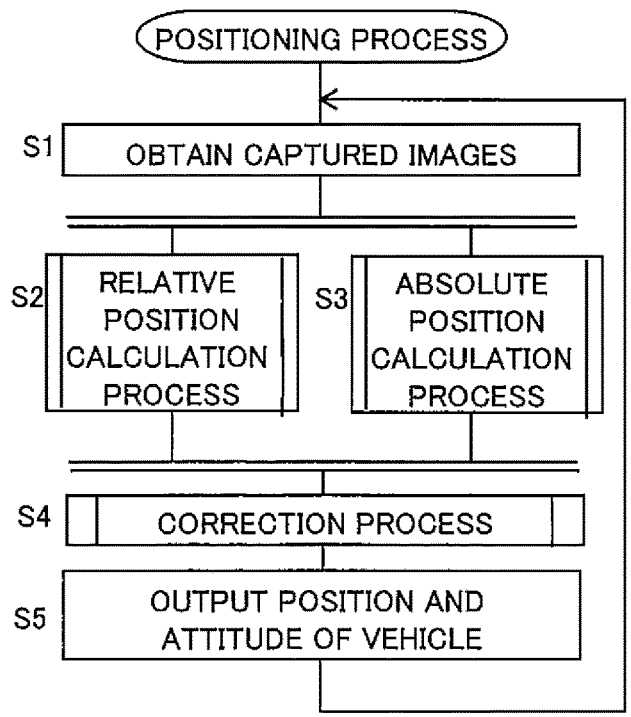
FIG. 8 is a flowchart showing a positioning process executed by the positioning apparatus 12 of FIG. 2.

FIG. 8 is a flowchart showing a positioning process executed by the positioning apparatus 12 of FIG. 2.

In step S1, the positioning apparatus 12 obtains the images captured by the image capturing apparatus 11. In step S2, the image processor 31 and the relative position calculator 32 execute a relative position calculation process to calculate a relative position and a relative attitude of the vehicle 1. In step S3, the image recognizer 33 and the absolute position calculator 34 execute an absolute position calculation process to calculate an absolute position and an absolute attitude of the vehicle 1. Steps S2 and S3 may be executed in parallel as shown in FIG. 8, or may be executed sequentially. In step S4, the corrector 36 executes a correction process to correct the relative position and the relative attitude based on the absolute position and the absolute attitude, and generate a corrected position and a corrected attitude of the vehicle 1. In step S5, the corrector 36 outputs the corrected position and the corrected attitude of the vehicle 1 to the communication apparatus 13 and the display apparatus 14.

[Relative Position Calculation Process]

Figure 9:
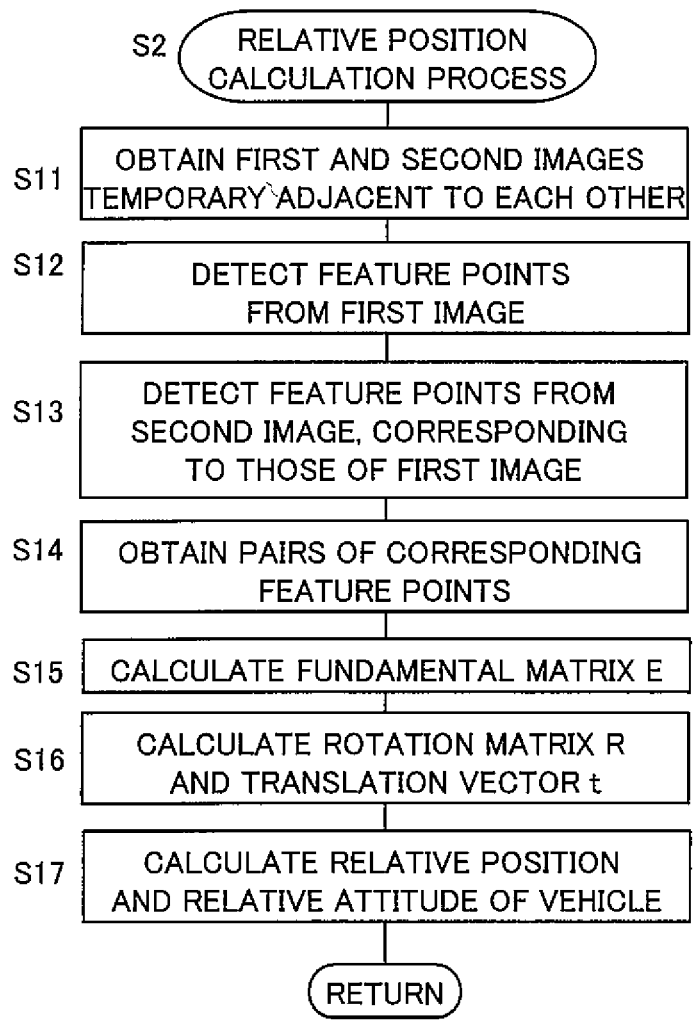
FIG. 9 is a flowchart showing a subroutine of step S2 (relative position calculation process) of FIG. 8.

FIG. 9 is a flowchart showing a subroutine of step S2 (relative position calculation process) of FIG. 8.

In step S11, the image processor 31 obtains first and second images captured at a first and a second time moments separated by a certain time length from each other (for example, first and second images of temporary adjacent frames).

In step S12, the image processor 31 detects feature points from the first image. Image processing techniques, such as the Features from Accelerated Segment Test (FAST), may be used to detect the feature points from the image.

In step S13, the image processor 31 detects feature points from the second image, corresponding to the feature points of the first image. Well-known image processing techniques, such as the Kanade-Lucas-Tomasi (KLT) tracker, may be used to detect the feature points corresponding among the images.

Figure 10:
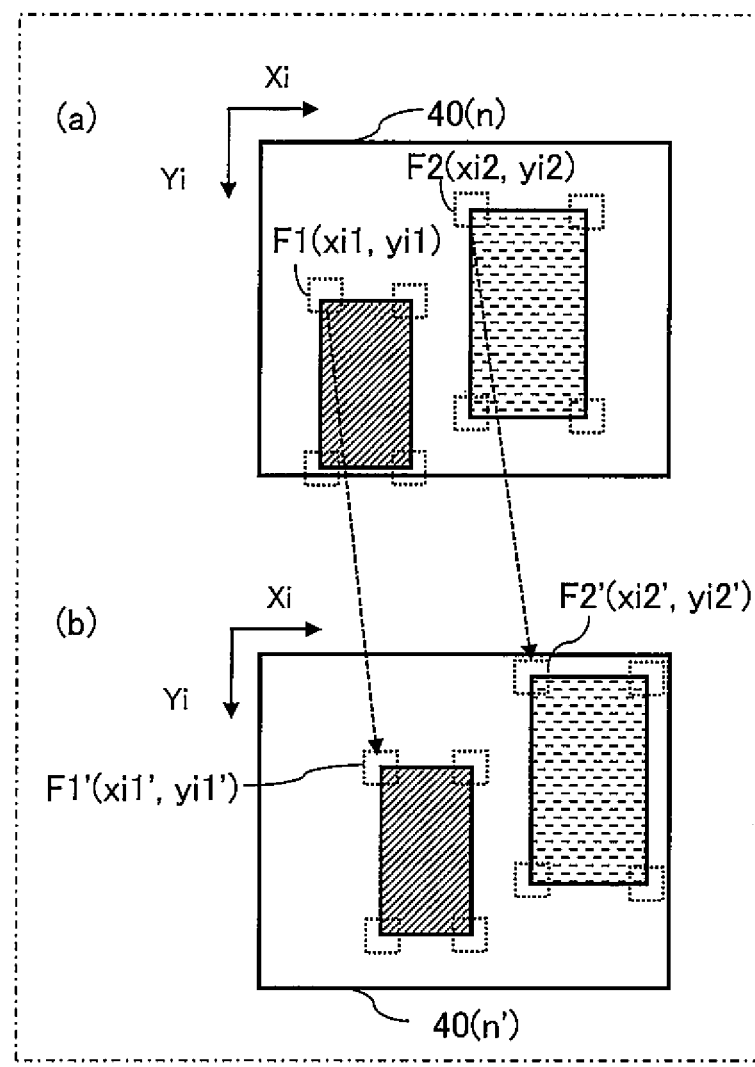
FIG. 10 shows feature points extracted by an image processor 31 of FIG. 3; (a) shows feature points F1 and F2 extracted from an image 40(n) at time moment n; and (b) shows feature points F1' and F2' extracted from an image 40(n') at time moment n'.

FIG. 10 is a diagram showing feature points extracted by the image processor 31 of FIG. 3. FIG. 10(a) shows feature points F1 and F2 extracted from an image 40(n) at time moment n. FIG. 10(b) shows feature points F1' and F2' extracted from an image 40(n') at time moment n'. In the image coordinate system of the image 40(n) of FIG. 10(a), the feature point F1 has coordinates (xi1, yi1), and the feature point F2 has coordinates (xi2, yi2). In the image coordinate system of the image 40(n') of FIG. 10(b), the feature point F1' has coordinates (xi1',yi1'), and the feature point F2' has coordinates (xi2',yi2'). The feature points F1' and F2' of FIG. 10(b) correspond to the feature points F1 and F2 of FIG. 10(a), respectively.

In step S14 of FIG. 9, the image processor 31 obtains pairs of coordinates of the corresponding feature points in the first and second images. For example, the image processor 31 obtains a pair of coordinates (xi1, yi1; xi1', yi1') of the feature points F1 and F1', and a pair of coordinates (xi2, yi2; xi2', yi2') of the feature points F2 and F2'.

In step S15, the relative position calculator 32 calculates a fundamental matrix E having 3×3 elements, based on the coordinates of the feature points obtained in step S14, for example, using a 5-point algorithm.

In step S16, the relative position calculator 32 performs singular value decomposition of the fundamental matrix E to calculate a rotation matrix R and a translation vector t, which represent movement of the vehicle 1 between time moments of capturing the first and second images, respectively. The rotation matrix R indicates a change in the attitude of the vehicle 1 between the time moments of capturing the first and second images, respectively. The translation vector t indicates a change in the position of the vehicle 1 between the time moments of capturing the first and second images, respectively.

For example, calculations of the rotation matrix R and the translation vector t are formulated as follows.

The fundamental matrix E is expressed as $E=U\Sigma V^T$ by performing singular value decomposition. Where $\Sigma$ is a diagonal matrix having 3×3 elements, and each of U and V is an orthogonal matrix having 3×3 elements.

The rotation matrix R is calculated as $R=UW^{-1}V^T$, using the following matrix W having 3×3 elements.

$$W = \begin{pmatrix} 0 & -1 & 0 \\ 1 & 0 & 0 \\ 0 & 0 & 1 \end{pmatrix}$$ [Mathematical Expression 1]

In addition, a matrix $T=VW\Sigma V^T$ having 3×3 elements is calculated to obtain the translation vector t. The matrix T satisfies E=TR, and is represented as follows.

$$T = \begin{pmatrix} 0 & -t_z & t_y \\ t_z & 0 & -t_x \\ -t_y & t_x & 0 \end{pmatrix}$$ [Mathematical Expression 2]

The translation vector t is represented as $t=(t_x, t_y, t_z)^T$ using the elements of the matrix T.

In step S17, the relative position calculator 32 calculates and outputs the relative position and the relative attitude of the vehicle 1. When the vehicle 1 has a relative position t(n−1) and a relative attitude R(n−1) at an most recent time moment n−1, a relative position t(n) of the vehicle 1 at the current time moment n is represented as t(n)=t(n−1)+tR(n−1), using the translation vector t calculated in step S16. In addition, a relative attitude R(n) of the vehicle 1 at the current time moment n is represented as R(n)=RR(n−1), using the rotation matrix R calculated in step S16. Thus, the relative position calculator 32 calculates the relative position and the relative attitude of the vehicle 1 with respect to the reference position and the reference attitude, by cumulatively adding a plurality of translation vectors, and cumulatively multiplying a plurality of rotation matrices.

[Absolute Position Calculation Process]

Figure 11:
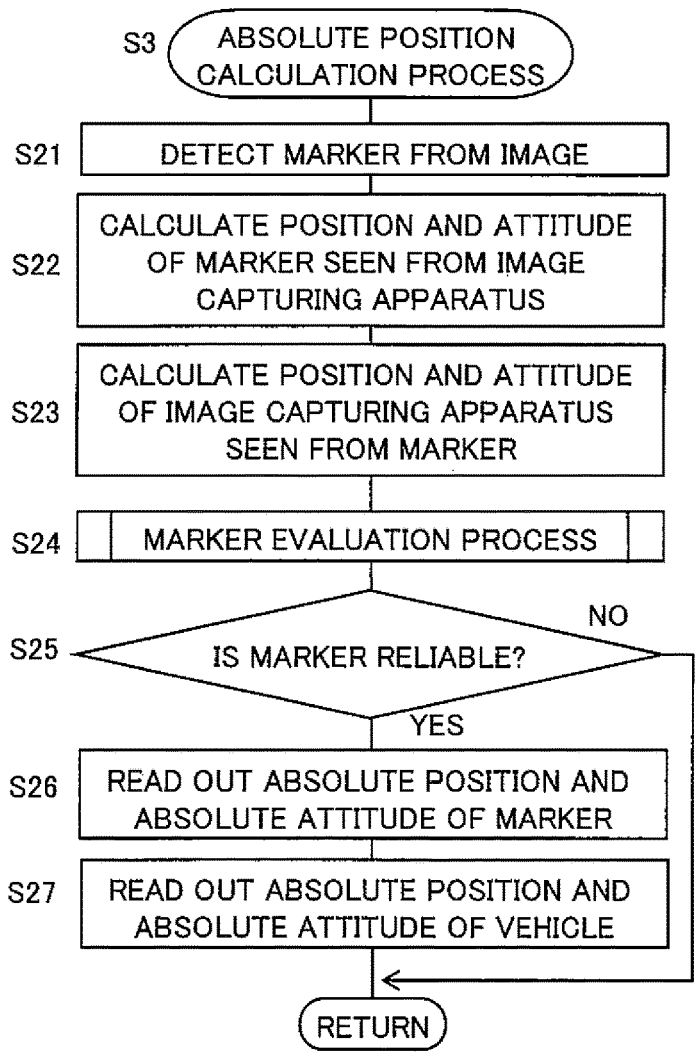
FIG. 11 is a flowchart showing a subroutine of step S3 (absolute position calculation process) of FIG. 8.

FIG. 11 is a flowchart showing a subroutine of step S3 (absolute position calculation process) of FIG. 8.

In step S21, the image recognizer 33 detects the marker 4 from the image.

In this case, the image recognizer 33 detects coordinates of four vertices (corners) of the quadrangular marker 4 in the image coordinate system, and decodes a pattern of the marker 4 to obtain the identifier of the marker 4. The image recognizer 33 may detect coordinates of some predetermined points, instead of the four vertices of the marker 4.

Figure 12:
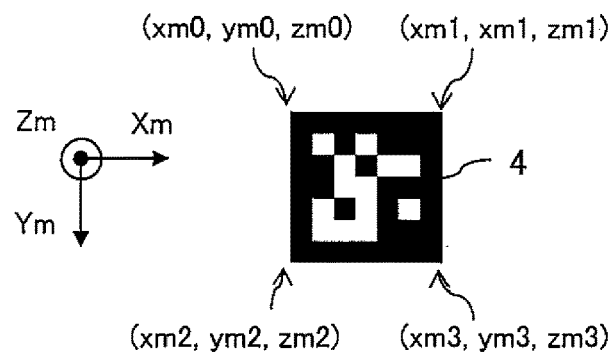
FIG. 12 is a diagram showing coordinates of vertices of the marker 4 in a marker coordinate system.

FIG. 12 is a diagram showing the coordinates of the vertices of the marker 4 in the marker coordinate system. In the marker coordinate system (Xm, Ym, Zm), the four vertices of the marker 4 have coordinates (xm0, ym0, zm0), (xm1, ym1, zm1), (xm2, ym2, zm2), and (xm3, ym3, zm3), respectively. Since the size of the marker 4 is known, the coordinates of the four vertices of the marker 4 in the marker coordinate system are also known. For example, when the upper left vertex of the marker 4 of FIG. 12 is an origin of the marker coordinate system (Xm, Ym, Zm), and the marker 4 has a size of 30 cm×30 cm, the vertices of the marker 4 have coordinates, for example, (xm0, ym0, zm0)=(0, 0, 0), (xm1, ym1, zm1)=(0.3, 0, 0), (xm2, ym2, zm2)=(0, 0.3, 0), and (xm3, ym3, zm3)=(0.3, 0.3, 0).

Figure 13:
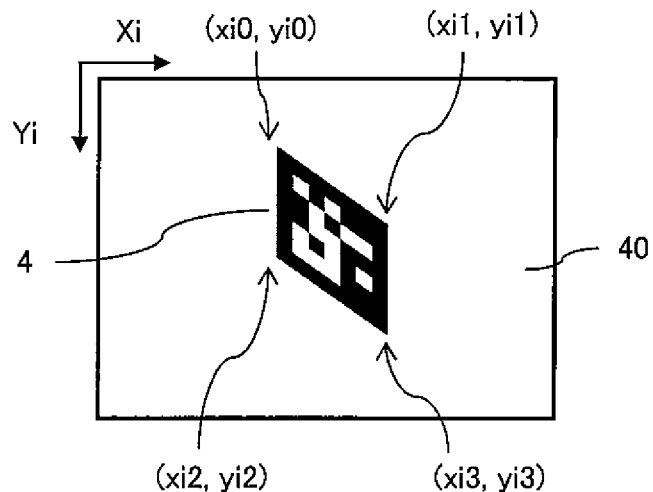
FIG. 13 is a diagram showing coordinates of vertices of the marker 4 in the image 40 captured by the image capturing apparatus 11 of FIG. 1.

FIG. 13 is a diagram showing coordinates of vertices of the marker 4 in the image 40 captured by the image capturing apparatus 11 of FIG. 1. In the image coordinate system (Xi, Yi), the four vertices of the marker 4 have coordinates (xi0, yi0), (xi1, yi1), (xi2, yi2), and (xi3, yi3), respectively.

In step S22 of FIG. 11, the absolute position calculator 34 calculates the position and the attitude of the marker 4 in a three-dimensional coordinate system whose origin is located at the image capturing apparatus 11 (camera coordinate system), based on the coordinates of the marker 4 detected in step S21 (i.e., the position and the attitude of the marker 4 as seen from the image capturing apparatus 11). For example, the absolute position calculator 34 calculates the position and the attitude of the marker 4 as seen from the image capturing apparatus 11, by solving a perspective n point (PnP) problem based on the coordinates of the four vertices of the marker 4 in the two-dimensional image coordinate system, and based on the coordinates of the four vertices of the marker 4 in the three-dimensional marker coordinate system.

In step S23, the absolute position calculator 34 calculates the position and the attitude of the image capturing apparatus 11 in the marker coordinate system (i.e., the position and the attitude of the image capturing apparatus 11 as seen from the marker 4). In this case, the position of the marker 4 as seen from the image capturing apparatus 11 is represented by the translation vector t, and the attitude of the marker 4 as seen from the image capturing apparatus 11 is represented by the rotation matrix R. In this case, the attitude of the image capturing apparatus 11 as seen from the marker 4 is represented by $R^{-1}$, and the position of the image capturing apparatus 11 as seen from the marker 4 is represented by $-R^{-1}t$.

In step S24, the absolute position calculator 34 executes a marker evaluation process (described later with reference to FIG. 17 to FIG. 29) to determine whether or not the marker 4 is captured at an appropriate angle and from an appropriate distance, that is, whether or not the recognized marker 4 is reliable. When the recognized marker 4 is determined to be reliable, the process proceeds from step S25 to step S26, otherwise, the process proceeds from step S25 to step S4 in FIG. 8.

In step S26, the absolute position calculator 34 reads out the position and the attitude of the marker 4 in the world coordinate system (i.e., the absolute position and the absolute attitude of the marker 4) from the storage apparatus 35, based on the identifier of the marker 4 detected in step S21.

In step S27, the absolute position calculator 34 calculates the position and the attitude of the vehicle 1 in the world coordinate system (i.e., the absolute position and the absolute attitude of the vehicle 1), based on the position and the attitude of the image capturing apparatus 11 in the marker coordinate system calculated in step S23, and based on the position and the attitude of the marker 4 in the world coordinate system read out in step S26. The position and the attitude of the vehicle 1 in the world coordinate system can be obtained by adding the position and the attitude of the marker 4 in the world coordinate system, as offset values, to the position and the attitude of the image capturing apparatus 11 in the marker coordinate system.

[Correction Process]

Figure 14:
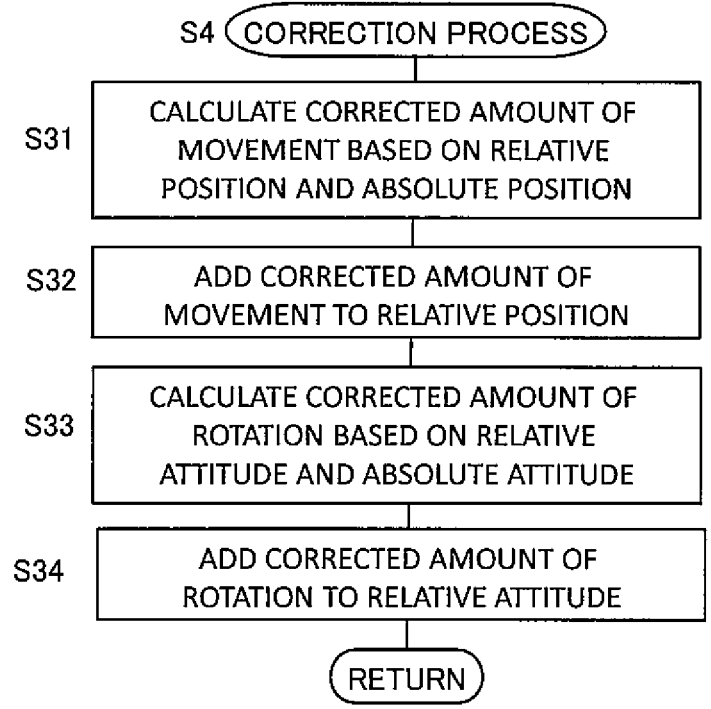
FIG. 14 is a flowchart showing a subroutine of step S4 (correction process) of FIG. 8.

FIG. 14 is a flowchart showing a subroutine of step S4 (correction process) of FIG. 8.

When executing the correction process in FIG. 14, the corrector 36 initially stores therein the latest absolute position and absolute attitude calculated previously.

In step S31, the corrector 36 calculates a corrected amount of movement of the vehicle 1 based on the relative position and the absolute position of the vehicle 1.

Figure 15:
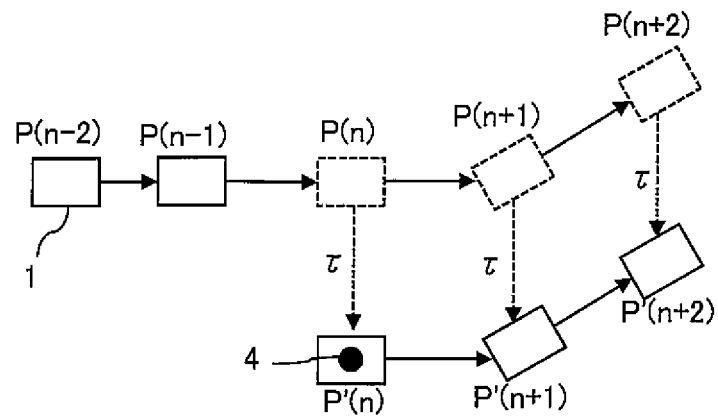
FIG. 15 is a diagram for explaining a corrected amount of movement calculated in step S31 of FIG. 14.

FIG. 15 is a diagram for explaining the corrected amount of movement calculated in step S31 of FIG. 14. FIG. 15 shows a position of the vehicle 1 calculated by the positioning apparatus 12. At time moments n−2 to n+2, the vehicle 1 has relative positions P(n−2) to P(n+2). When the vehicle 1 arrives at the relative position P(n), the positioning apparatus 12 detects the marker 4. At this time, even if the relative position P(n) is remote from the marker 4 on the map, it is considered that the vehicle 1 is actually located near the marker 4. Therefore, the positioning apparatus 12 calculates a difference between the relative position P(n) and the position of the marker 4 as a corrected amount of movement τ. The positioning apparatus 12 adds the corrected amount of movement τ to the relative position P(n) to obtain a corrected position P'(n). Thereafter, the positioning apparatus 12 similarly adds the corrected amount of movement τ to the relative positions P(n+1), P(n+2), and so on, to obtain corrected positions P'(n+1), P'(n+2), and so on.

In step S32 of FIG. 14, the corrector 36 adds the corrected amount of movement of the vehicle 1 to the relative position of the vehicle 1.

In step S33, the corrector 36 calculates a corrected amount of rotation of the vehicle 1 based on the relative attitude and the absolute attitude of the vehicle 1.

Figure 16:
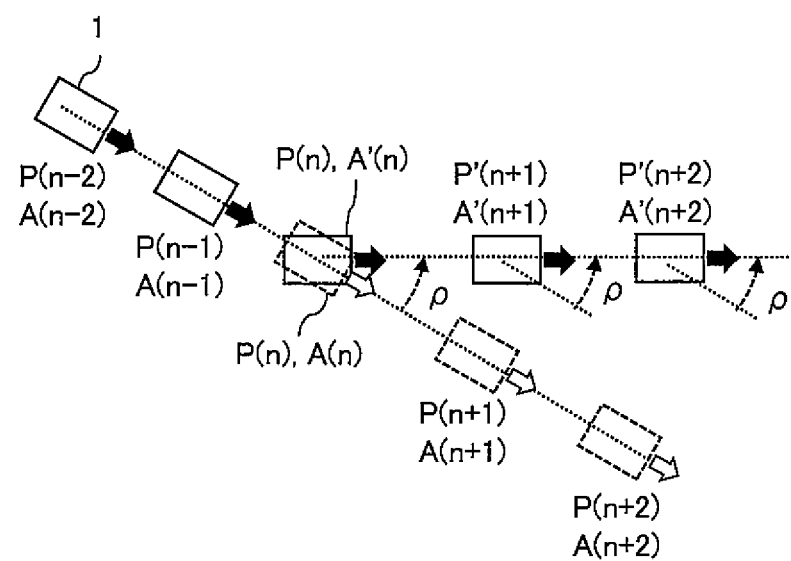
FIG. 16 is a diagram for explaining a corrected amount of rotation calculated in step S33 of FIG. 14.

FIG. 16 is a diagram for explaining the corrected amount of rotation calculated in step S33 of FIG. 14. FIG. 16 shows positions P and P' and attitudes A and A' of the vehicle 1 calculated by the positioning apparatus 12. At the time moments n−2 to n+2, the vehicle 1 has relative positions P(n−2) to P(n+2) and relative attitudes A(n−2) to A(n+2). In FIG. 16, each of thick arrows indicates an attitude of the vehicle 1. When the vehicle 1 arrives at the relative position P(n), the positioning apparatus 12 detects the marker 4, and calculates an absolute attitude of the vehicle 1. The positioning apparatus 12 calculates a difference between the relative attitude A(n) and the absolute attitude, as a corrected amount of rotation ρ, while setting the relative position P(n) at the center of rotation. The positioning apparatus 12 adds the corrected amount of rotation ρ to the relative attitude A(n) to obtain a corrected attitude A'(n). Thereafter, the positioning apparatus 12 similarly adds the corrected amount of rotation ρ to the relative attitudes A(n+1), A(n+2), and so on, to obtain corrected attitudes A'(n+1), A'(n+2), and so on.

In step S33, the corrector 36 may calculate, as the corrected amount of rotation of the vehicle 1, a difference between the absolute attitude and an average of a plurality of relative attitudes calculated over a predetermined time length (or in correspondence with a predetermined number of consecutive images). It is difficult to determine the actual traveling direction of the vehicle 1 (for example, whether or not the vehicle 1 is travelling along the passageway 101), based on only an instantaneous value of the relative attitude of the vehicle 1. In addition, the relative attitude of the vehicle 1 may include an error. Accordingly, it is possible to accurately determine the actual traveling direction of the vehicle 1 using the average of the plurality of relative attitudes.

In step S34 of FIG. 14, the corrector 36 adds the corrected amount of rotation of the vehicle 1 to the relative attitude of the vehicle 1.

[Marker Evaluation Process]

Figure 17:
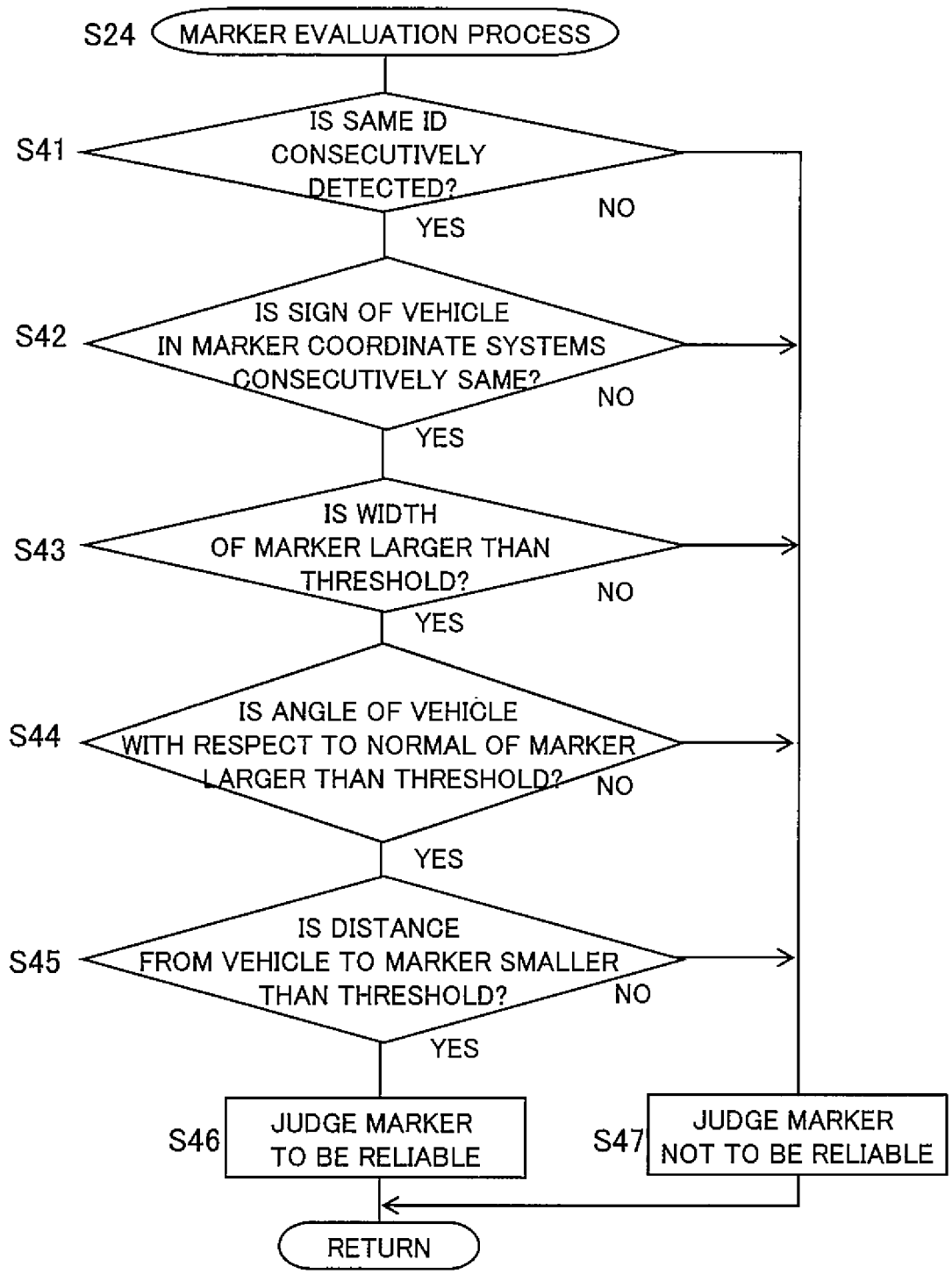
FIG. 17 is a flowchart showing a subroutine of step S24 (marker evaluation process) of FIG. 11.

FIG. 17 is a flowchart showing a subroutine of step S24 (marker evaluation process) of FIG. 11.

In step S41, the absolute position calculator 34 counts the number of images from which the marker 4 having the same identifier is extracted, among the images consecutively captured by the image capturing apparatus 11. Further, in step S41, the absolute position calculator 34 determines whether or not a predetermined number of markers 4 extracted from a predetermined number of images consecutively captured by the image capturing apparatus 11 has the same identifier; If YES, the process proceeds to step S42, and if NO, the process proceeds to step S47.

Figures 18, 19:
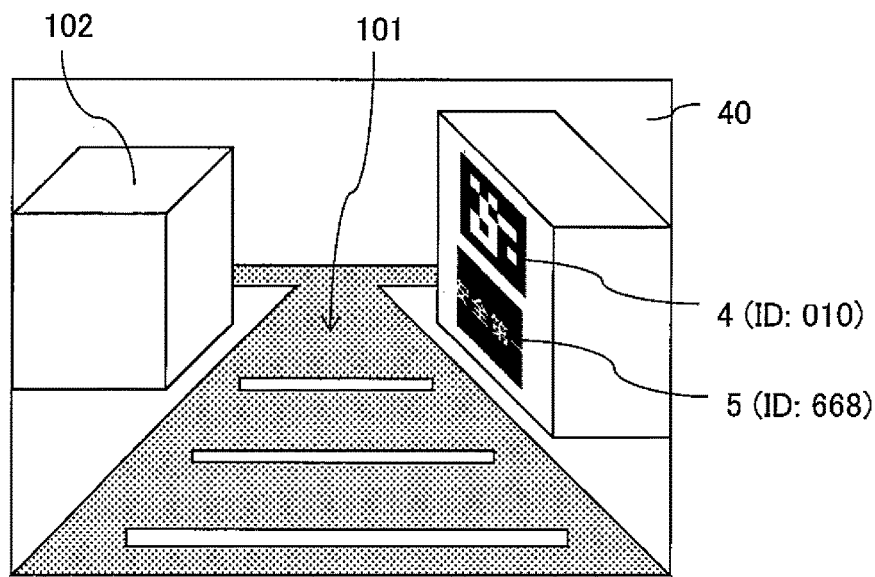
FIG. 18 is a diagram showing an example of the image 40 captured by the image capturing apparatus 11 of FIG. 1.
FIG. 19 is a table including a marker 4 detected by an image recognizer 33 of FIG. 3, and including an object erroneously detected as a marker 4.

FIG. 18 is a diagram showing an example of the image 40 captured by the image capturing apparatus 11 of FIG. 1. When capturing the marker 4 in an environment including a complex background, such as a warehouse or factory, an object 5 may be erroneously recognized as a marker, i.e., a visually distinguishable area having a marker identifier (for example, ID: 668). In particular, when the pattern of the marker 4 is simple, a different object 5 is likely to be erroneously recognized as a marker.

FIG. 19 is a table including a markers 4 detected by the image recognizer 33 of FIG. 3, and including an object erroneously detected as a marker 4. Each row of the table in FIG. 19 indicates a candidate for the marker 4 (marker 4 or erroneously detected object) extracted from each of the images captured by the image capturing apparatus 11. One or more candidates of the marker 4 may be detected in one image. Conversely, no candidate of the marker 4 may be detected in an image. The table in FIG. 19 indicates the identifier (ID) (first column), the time when capturing the image including the candidate of the marker 4 (second column), the position (third to fifth columns), and the angle (sixth column) of each candidate of the marker 4. When the image recognizer 33 detects the marker 4, the object 5 near the marker 4 may be temporarily erroneously recognized as a marker. However, even when the object 5 in a certain image is erroneously detected as the marker 4, there would be a very low possibility that the object 5 is erroneously detected as the marker 4 similarly over a plurality of consecutive images. Therefore, even when the object 5 having a certain identifier (for example, ID: 668) is detected in a certain image, it is possible to determine that the object 5 is not the marker 4 when the object 5 is not detected over a plurality of consecutive images. On the other hand, when the markers 4 having the same identifier (for example, ID: 010) are detected over the plurality of images consecutively captured by the image capturing apparatus 11, it is possible to determine that the markers 4 are detected.

A threshold (predetermined number) in step S41 of FIG. 17 is set to, for example, "3," but may be set to any other value.

In step S42 in FIG. 17, the absolute position calculator 34 calculates the position and attitude of the image capturing apparatus 11 (i.e., the vehicle 1) in each of a predetermined number of marker coordinate systems with origins at a predetermined number of markers 4 having the same identifier and extracted from a predetermined number of images consecutively captured by the image capturing apparatus 11. Further, in step S42, the absolute position calculator 34 determines whether or not the coordinates of the image capturing apparatus 11 (i.e., the vehicle 1) in the marker coordinate systems have the same sign over a predetermined number (threshold) of images; if YES, the process proceeds to step S43, and if NO, the process proceeds to step S47.

Figure 20:
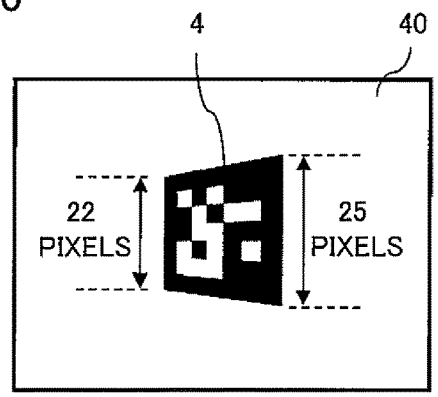
FIG. 20 is a diagram showing an example of the image 40 captured by the image capturing apparatus 11 of FIG. 1, the image 40 including the marker 4 suitable to calculate an absolute position and an absolute attitude of the vehicle 1.
Figure 21:
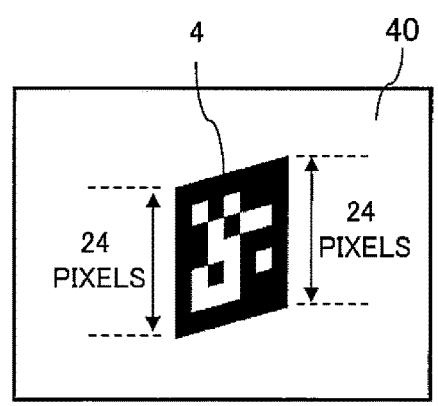
FIG. 21 is a diagram showing an example of the image 40 captured by the image capturing apparatus 11 of FIG. 1, the image 40 including the marker 4 not suitable to calculate the absolute position and the absolute attitude of the vehicle 1.

FIG. 20 is a diagram showing an example of the image 40 captured by the image capturing apparatus 11 of FIG. 1, the image 40 including the marker 4 suitable to calculate the absolute position and the absolute attitude of the vehicle 1. FIG. 21 is a diagram showing an example of the image 40 captured by the image capturing apparatus 11 of FIG. 1, the image 40 including the marker 4 not suitable to calculate the absolute position and the absolute attitude of the vehicle 1. In the image 40, for example, when opposite sides of a rectangular marker 4 have different lengths, it is possible to definitely determine from where the image capturing apparatus 11 is capturing the marker 4, i.e., definitely determine the position of the image capturing apparatus 11 in the marker coordinate system. For example, as shown in FIG. 20, when the right side of the marker 4 is longer than the left side of the marker 4, it is possible to determine that the marker 4 is captured from the right side of the marker 4. On the other hand, in the image 40, for example, when the opposite sides of the rectangular marker 4 have the same length, it is difficult to determine the position of the image capturing apparatus 11 in the marker coordinate system. For example, as shown in FIG. 21, when the right side and the left side of the marker 4 have the same length, it is not possible to determine whether the marker 4 is captured from the right side of the marker 4, or from the left side of the marker 4.

Figure 22:
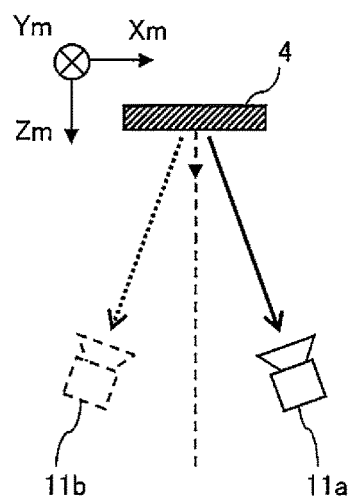
FIG. 22 is a diagram illustrating inversion of the position of the image capturing apparatus 11 in a marker coordinate system.

FIG. 22 is a diagram explaining an inversion of the position of the image capturing apparatus 11 in the marker coordinate system. In the example in FIG. 23, an image capturing apparatus 11*a* located on the right side with respect to a normal line of the marker 4 has positive an Xm coordinate, and an image capturing apparatus 11*b* located on the left side with respect to the normal line of the marker 4 has an negative Xm coordinate.

FIG. 23 is a table showing changes in the position of the image capturing apparatus 11 in the marker coordinate systems, the position being calculated by the position calculator 34 of FIG. 3. Each row of the table in FIG. 23 corresponds to each image captured by the image capturing apparatus 11, and indicates the identifier of one marker 4 included in each image, and the position and attitude of the image capturing apparatus 11 in a marker coordinate system with an origin at this marker 4. When the opposite sides of a square marker 4 have the same length to each other, and it is difficult to determine the position of the image capturing apparatus 11 in the marker coordinate system, the sign of the coordinate of the image capturing apparatus 11 in the marker coordinate system is likely to vary. Therefore, when the sign of the coordinate of the image capturing apparatus 11 in the marker coordinate systems changes frequently, it is possible to determine that the images 40 including the marker 4 are not suitable to calculate the absolute position and the absolute attitude of the vehicle 1. On the other hand, when the coordinates of the image capturing apparatus 11 in the marker coordinate systems have the same sign over the predetermined number of images, it is possible to determine that the images 40 including the marker 4 are suitable to calculate the absolute position and the absolute attitude of the vehicle 1.

In an example in FIG. 23, since the sign of the Xm coordinates alternates over the 2nd to 4th rows, corresponding images are not suitable to calculate the absolute position and the absolute attitude of the vehicle 1. On the other hand, since the Xm, Ym, and Zm coordinates have the same signs over the 4th to 6th row, corresponding images are suitable to calculate the absolute position and the absolute attitude of the vehicle 1.

A threshold (predetermined number) in step S42 in FIG. 17 is set to, for example, "3", but may be set to any other value.

Of step S43 in FIG. 17, the absolute position calculator 34 calculates a size of the marker 4 in the image captured by the image capturing apparatus 11. Further, in step S43, the absolute position calculator 34 determines whether or not the size of the marker 4 in the image captured by the image capturing apparatus 11 is larger than a predetermined threshold; if YES, the process proceeds to step S44, and if NO, the process proceeds to step S47.

FIG. 24 is a diagram showing an example of an image of the marker 4 captured by the image capturing apparatus 11 of FIG. 1, the image having a width suitable to calculate the absolute position and the absolute attitude of the vehicle 1. FIG. 25 is a diagram showing an example of an image of the marker 4 captured by the image capturing apparatus 11 of FIG. 1, the image not having a width suitable to calculate the absolute position and the absolute attitude of the vehicle 1. FIG. 24 and FIG. 25 show sizes (numbers of pixels) of the markers 4 in the images captured by the image capturing apparatus 11. In the examples in FIG. 24 and FIG. 25, the size of the marker 4 is represented by the number of pixels from each vertex to its opposite side. In order to correctly recognize the pattern of the marker 4, the marker 4 needs to have a sufficient size (number of pixels) in the image captured by the image capturing apparatus 11. For example, the marker 4 shown in FIG. 5 has a pattern consisting of 7×7 white or black square cells in the vertical and horizontal directions. In this case, the number of pixels of the marker 4 as shown in FIG. 24 is sufficient for recognizing the cells of the pattern. On the other hand, the number of pixels of the marker 4 as shown in FIG. 25 is apparently insufficient for recognizing the cells of the pattern.

Figure 26:
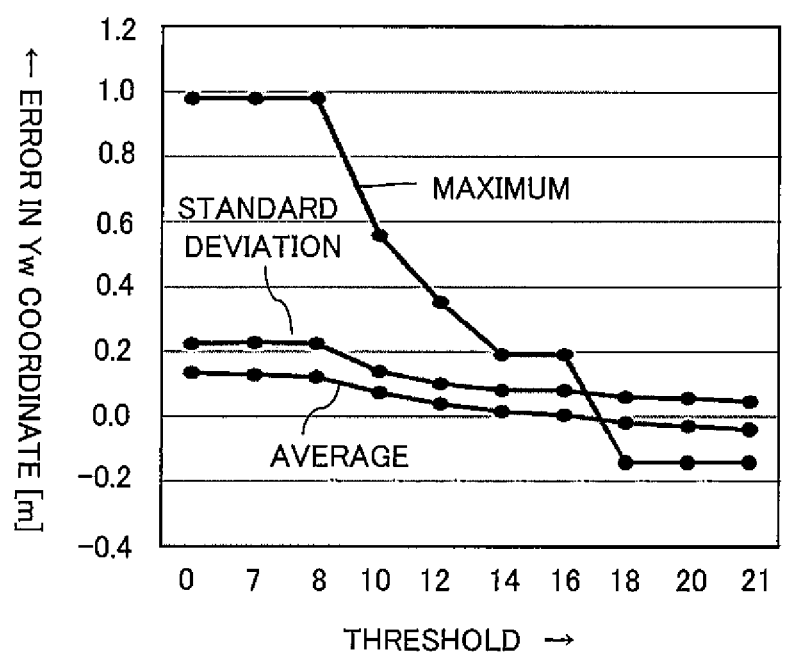
FIG. 26 is a graph showing an error in the absolute position of the vehicle 1 with a threshold of step S43 in FIG. 17 being changed.

FIG. 26 is a graph showing an error in the absolute position of the vehicle 1 with the threshold in the step S43 of FIG. 17 being changed. Referring to FIG. 26, it can be seen that the error is reduced when the threshold is set to 14 or larger. Therefore, when the size of the marker 4 in the image captured by the image capturing apparatus 11 is smaller than the predetermined threshold, it is possible to determine that the image 40 including the marker 4 is not suitable to calculate the absolute position and the absolute attitude of the vehicle 1. On the other hand, when the size of the marker 4 in the image captured by the image capturing apparatus 11 is larger than the predetermined threshold, it is possible to determine that the image 40 including the marker 4 is suitable to calculate the absolute position and the absolute attitude of the vehicle 1.

The size of the marker 4 may be represented by a length of each side, a total length of sides, a length of a diagonal line, or an area of the marker, instead of the distance (number of pixels) from each vertex to the opposite side.

In step S44 in FIG. 17, the absolute position calculator 34 calculates an angle of a direction of the vehicle 1 with respect to a normal line to a plane of one marker 4, based on the position and attitude of the vehicle 1 in the marker coordinate system with an origin at the one marker 4. Further, in step S44, the absolute position calculator 34 determines whether or not the angle of a direction of the image capturing apparatus 11 (i.e., vehicle 1) with respect to the normal line to the plane of the one marker 4 in the marker coordinate system is larger than a predetermined threshold αth; if YES, the process proceeds to step S45, and if NO, the process proceeds to step S47. When directions of the image capturing apparatus 11 and the vehicle 1 are different from each other, the absolute position calculator 34 determines whether or not an angle between the image capturing apparatus 11 and the normal line to the plane of the marker 4 is larger than the threshold αth; if YES, the process proceeds to step S45, and if NO, the process proceeds to step S47.

Figure 27:
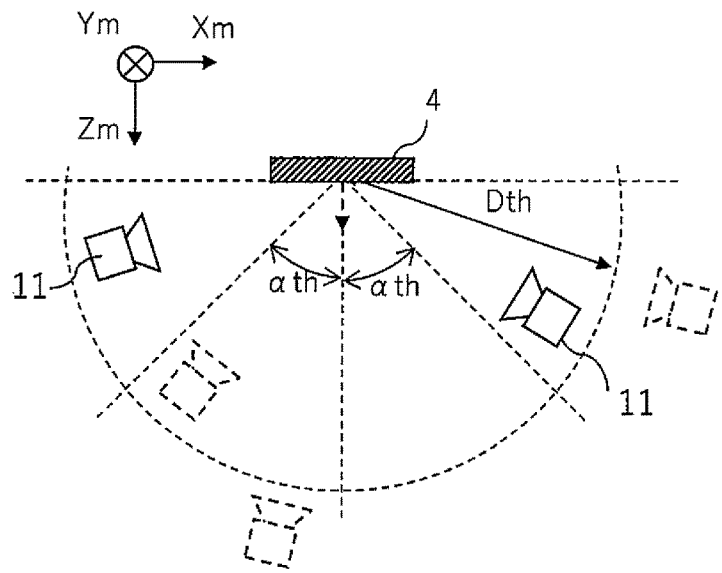
FIG. 27 is a diagram showing angles and distances in the marker coordinate system, at which an image of the marker 4 suitable to calculate the absolute position and the absolute attitude of the vehicle 1 can be captured.

FIG. 27 is a diagram explaining an angle and a distance in the marker coordinate system, at which an image of the marker 4 suitable to calculate the absolute position and the absolute attitude of the vehicle 1 can be captured. As described above in connection with step S42, in the image 40, for example, when the opposite sides of the rectangular marker 4 have different lengths from each other, it is possible to definitely determine the position of the image capturing apparatus 11 in the marker coordinate system. Therefore, the image capturing apparatus 11 captures the marker 4 not from the normal direction (front) of the marker 4, but from a direction sufficiently inclined from the normal direction of the marker 4.

Figure 28:
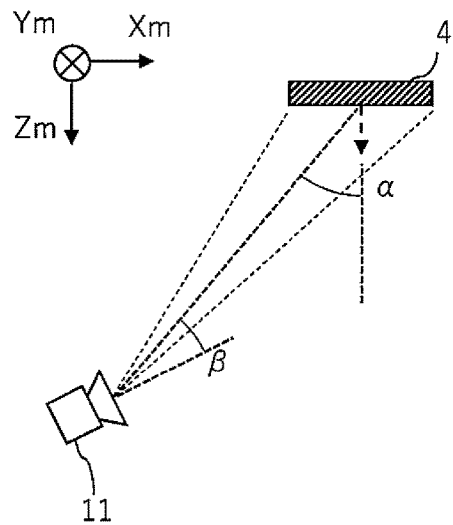
FIG. 28 is a diagram illustrating angular conditions to capture an image of the marker 4 suitable to calculate the absolute position and the absolute attitude of the vehicle 1.
Figure 29:
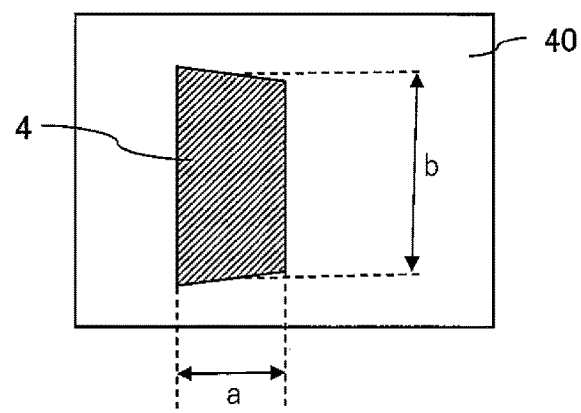
FIG. 29 is a diagram showing an example of an image including the marker 4 captured by the image capturing apparatus 11 of FIG. 28.

FIG. 28 is a diagram for illustrating angular conditions to capture an image of the marker 4 suitable to calculate the absolute position and the absolute attitude of the vehicle 1. FIG. 29 is a diagram showing an example of an image including the marker 4 captured by the image capturing apparatus 11 of FIG. 28. In FIG. 28, a denotes an angle of the direction of the image capturing apparatus 11 with respect to the normal line to the plane of the marker 4. The angle $\alpha$ satisfies $\alpha=\arccos(a/b)$. In this case, a and b denote the size of the marker 4 in the image 40 captured by the image capturing apparatus 11, as shown in FIG. 29. As the size becomes close to a:b=1:1, an accuracy degrades. The positive or negative of the angle $\alpha$ can be determined from an orientation of a trapezoid in FIG. 29. However, when the image capturing apparatus 11 captures the marker 4 from the front, or when a distance d from the image capturing apparatus 11 to the marker 4 increases, the determination on positive or negative of the angle $\alpha$ becomes unstable. $\beta$ denotes an angle of a direction of the marker 4 with respect to an optical axis of the image capturing apparatus 11. In other words, the angle $\beta$ indicates the position of the marker 4 in the image 40 captured by the image capturing apparatus 11. The distance d from the image capturing apparatus 11 to the marker 4 satisfies d=1/b. As a result, the accuracy is in the order of $\beta > d > \alpha$.

The threshold αth in step S44 in FIG. 17 is set to, for example, "45 degrees", but may be set to any other value. In addition, the threshold αth may vary depending on the distance from the image capturing apparatus 11 to the marker 4.

When the angle of the direction of the image capturing apparatus 11 with respect to the normal line to the plane of the marker 4 becomes closer to 90 degrees, the size of a of the marker 4 in the image captured by the image capturing apparatus 11 decreases, and it becomes difficult to satisfy the condition in step S43. The angle of the direction of the image capturing apparatus 11 with respect to the normal line to the plane of the marker 4 needs to satisfy both the conditions of steps S43 and S44.

In step S45 in FIG. 17, the absolute position calculator 34 calculates a distance from the vehicle 1 to the marker 4 based on the image captured by the image capturing apparatus 11. Further, in step S45, the absolute position calculator 34 determines whether or not the distance from the image capturing apparatus 11 (i.e., vehicle 1) to the marker 4 is smaller than a predetermined threshold; if YES, the process proceeds to step S46, and if NO, the process proceeds to step S47.

Referring again to FIG. 27, the image capturing apparatus 11 captures the marker 4 at a position in a distance shorter than a distance Dth from the marker 4. When the image capturing apparatus 11 is remote from the marker 4, the accuracy of the position and attitude of the vehicle 1 calculated by the positioning apparatus 12 degrades.

The threshold Dth in step S45 in FIG. 17 is set to, for example, "6 m" when the marker 4 has an A2 size, but the threshold Dth may be set to any other value. In addition, the threshold Dth may vary depending on the size of the marker 4.

In step S46 in FIG. 17, the absolute position calculator 34 determines that the marker 4 is reliable. In this case, the absolute position calculator 34 sends the absolute position and the absolute attitude calculated based on the position and attitude of the marker 4, to the corrector 36. On the other hand, in step S47, the absolute position calculator 34 determines that the marker 4 is unreliable. In this case, the absolute position calculator 34 does not send the absolute position and the absolute attitude calculated based on the position and attitude of the marker 4.

Thus, by executing the marker evaluation process in FIG. 17, the absolute position calculator 34 determines whether or not the marker 4 is captured at an appropriate angle and from an appropriate distance, i.e., whether or not the recognized marker 4 is reliable. As a result, in the correction process in step S4 in FIG. 8, the corrector 36 operates as follows.

When the markers 4 do not have the same identifier over the number of images equal to the predetermined threshold (NO in the step S41), the corrector 36 does not correct the position and attitude using the absolute position and the absolute attitude calculated based on the position and attitude of the marker 4. On the other hand, when the markers 4 have the same identifier over the number of images equal to or larger than the threshold (YES in step S41), the corrector 36 generates the corrected position and the corrected attitude using the absolute position and the absolute attitude calculated based on the position and attitude of the marker 4.

When the coordinates of the vehicle 1 in the marker coordinate systems do not have the same sign over the number of images equal to the predetermined threshold (NO in the step S42), the corrector 36 does not correct the position and attitude using the absolute position and the absolute attitude calculated based on the position and attitude of the marker 4. On the other hand, when the coordinates of the vehicle 1 in the marker coordinate systems have the same sign over the number of images equal to or larger than the threshold (YES in step S42), the corrector 36 generates the corrected position and the corrected attitude using the absolute position and the absolute attitude calculated based on the position and attitude of the marker 4.

When the marker 4 has the size equal to or smaller than the predetermined threshold (NO in step S43), the corrector 36 does not correct the position and attitude using the absolute position and the absolute attitude calculated based on the position and attitude of the marker 4. On the other hand, when the marker 4 has the size larger than the threshold (YES in the step S43), the corrector 36 generates the corrected position and the corrected attitude using the absolute position and the absolute attitude calculated based on the position and attitude of the marker 4.

When the angle of the direction of the vehicle 1 with respect to the normal line to the plane of one marker 4 is equal to or smaller than the predetermined threshold (NO in step S44), the corrector 36 does not correct the position and attitude using the absolute position and the absolute attitude calculated based on the position and attitude of the marker 4. On the other hand, when the angle of the direction of the vehicle 1 with respect to the normal line to the plane of one marker 4 is larger than the threshold (YES in the step S44), the corrector 36 generates the corrected position and the corrected attitude using the absolute position and the absolute attitude calculated based on the position and attitude of the marker 4.

When the marker 4 has the distance from the vehicle 1 equal to or more than the predetermined threshold (NO in the step S45), the corrector 36 does not correct the position and attitude using the absolute position and the absolute attitude calculated based on the position and attitude of the marker 4. On the other hand, when the marker 4 has the distance from the vehicle 1 less than the threshold (YES in step S45), the corrector 36 generates the corrected position and the corrected attitude using the absolute position and the absolute attitude calculated based on the position and attitude of the marker 4.

In the present specification, the threshold of step S44 is also referred to as a "first threshold". In addition, in the present specification, the threshold of step S41 is also referred to as a "second threshold". In addition, in the present specification, the threshold of step S42 is also referred to as a "third threshold". In addition, in the present specification, the threshold of step S43 is also referred to as a "fourth threshold". In addition, in the present specification, the threshold of step S45 is also referred to as a "fifth threshold".

Figure 30:
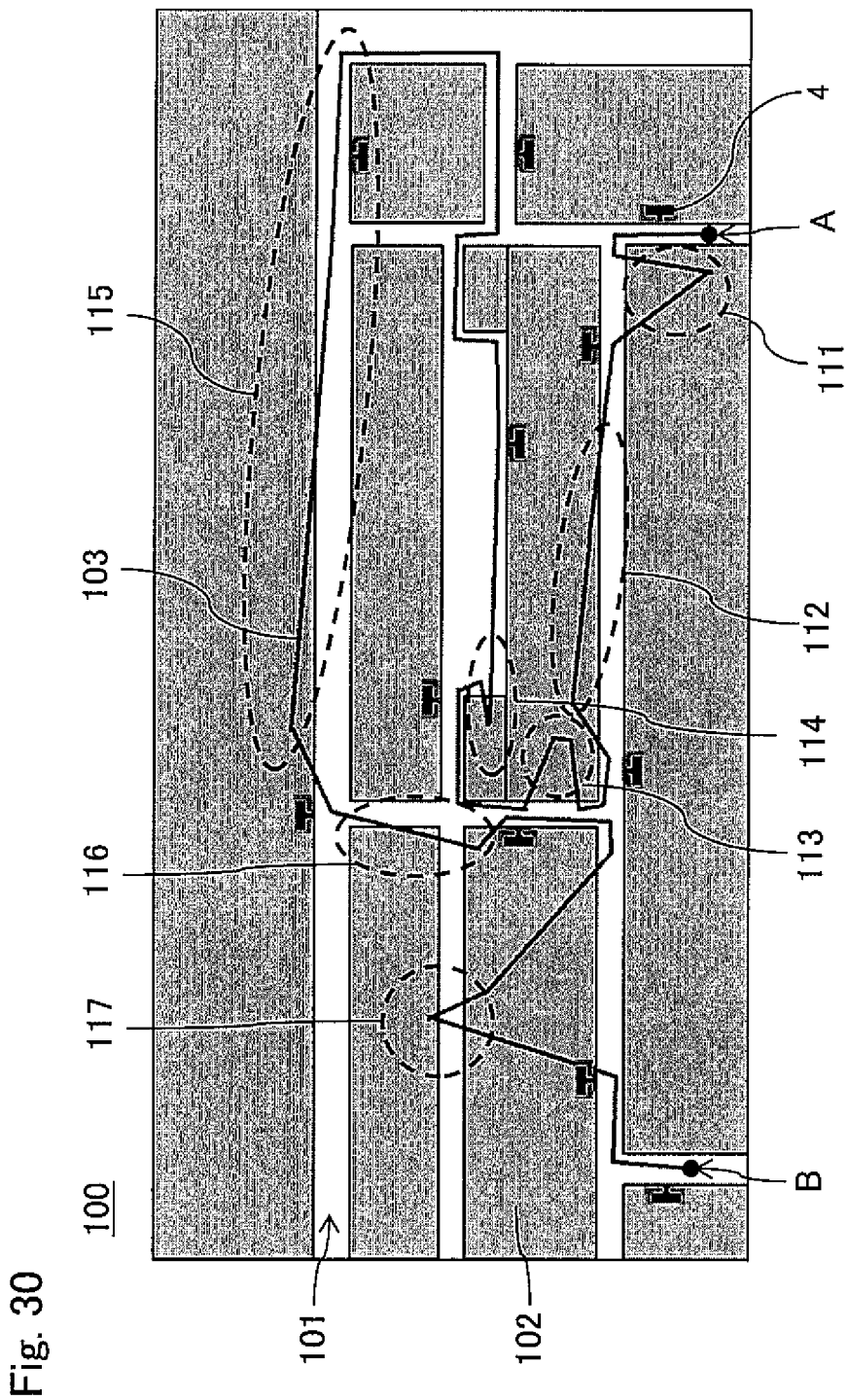
FIG. 30 is a diagram showing a trajectory 103 of the vehicle 1 calculated by executing a correction process according to a comparison example of the first embodiment.
Figure 31:
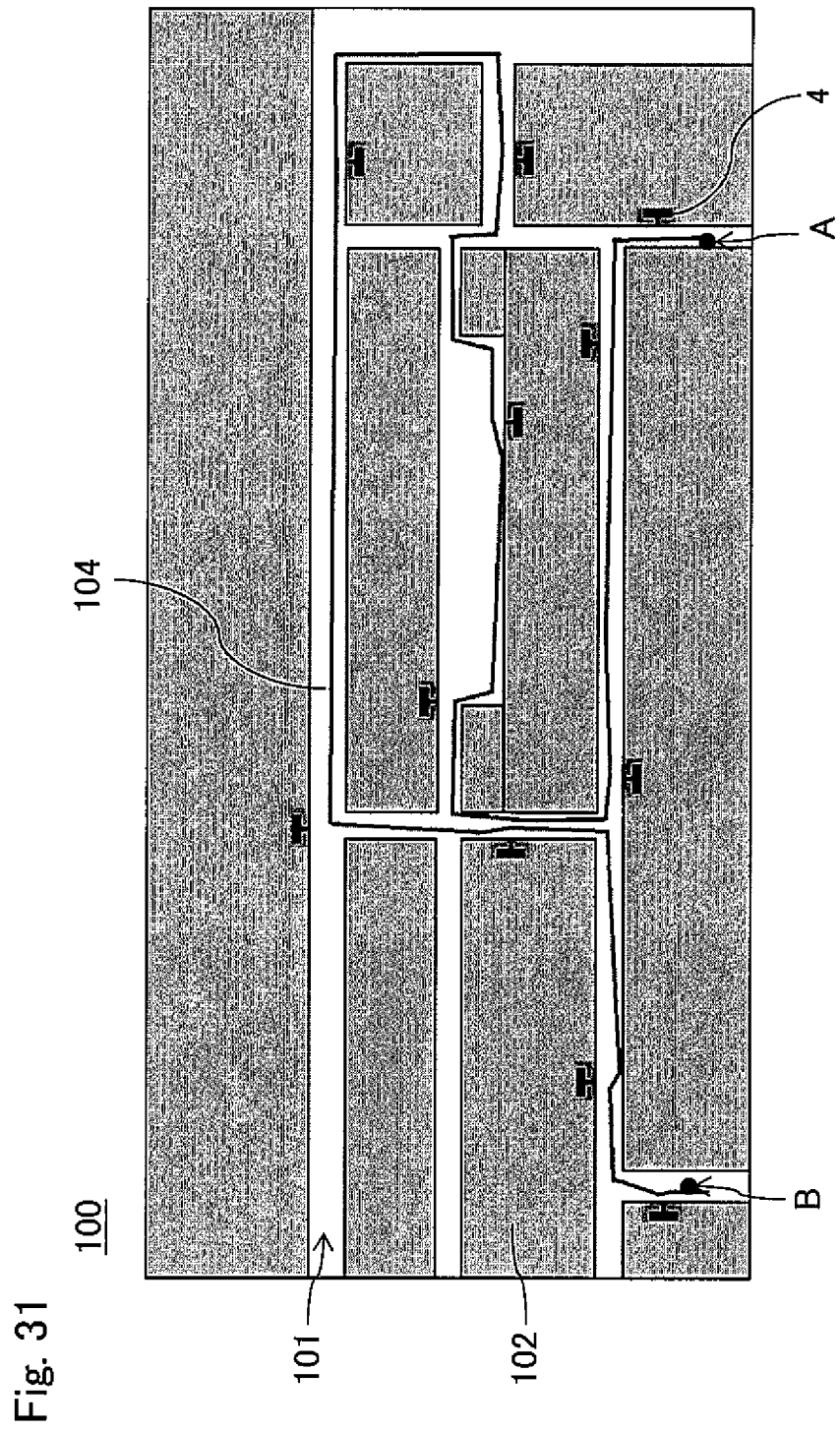
FIG. 31 is a diagram showing a trajectory 104 of the vehicle 1 calculated by executing the marker evaluation process of FIG. 17.

FIG. 30 is a diagram showing a trajectory 103 of the vehicle 1 calculated by executing a correction process according to a comparison example of the first embodiment. FIG. 31 is a diagram showing a trajectory 104 of the vehicle 1 calculated by executing the marker evaluation process of FIG. 17. Each of FIGS. 30 and 31 shows a protrusion provided on one side of each of the markers 4 to indicate a front surface of the marker 4 (Zm axis in FIG. 5) for convenience of explanation. Actually, such protrusion is not provided. Referring to FIG. 30, since the positions of the image capturing apparatus 11 in the marker coordinate systems have not been correctly determined in regions 111, 113, and 114, the positions of the image capturing apparatus 11 are inverted with respect to the normal lines of the markers 4 as show in FIG. 22, and therefore, errors occur in calculated positions of the vehicle 1. In addition, referring to FIG. 30, the accuracy of the calculated positions of the vehicle 1 degrades in regions 112, 115, and 116. In addition, in a region 117, since an object other than the marker 4 is erroneously detected as the marker 4, a large error has occurred. On the other hand, referring to FIG. 31, since the positioning apparatus 12 corrects the relative positions and the relative attitudes only based on the absolute positions and the absolute attitudes calculated based on the markers 4 captured at the appropriate angles and from the appropriate distances, it is possible to accurately measure the position and attitude of the vehicle 1.

According to the first embodiment, the relative position and the relative attitude calculated from the feature points 41 using Visual-SLAM or the like are corrected based on the absolute position and absolute attitude calculated from the markers 4, and therefore, it is possible to accurately measure the position and the attitude of the vehicle 1. In addition, according to the first embodiment, it is possible to more accurately measure the position and attitude of the vehicle 1, by determining whether or not a recognized marker 4 is reliable, and the position and attitude of the vehicle 1 based on the absolute position and the absolute attitude only when the marker 4 is reliable.

According to the first embodiment, it is possible to measure the position of the vehicle 1 at a low cost using the image capturing apparatus 11, even in an indoor place where radio waves from GPS satellites can not be received, such as a warehouse or a factory. Since it is not necessary to dispose a large number of wireless transmitters for transmitting wireless signals, initial costs can be reduced.

According to the first embodiment, it is possible to improve work based on the travelling path of the vehicle 1 obtained from positioning results.

According to the first embodiment, it can be utilized for determining the necessity of maintenance, the necessity of renewal of lease contracts, and the like, based on the travelled distance of the vehicle 1.

According to the first embodiment, it is possible to optimize a layout of passageways, shelves, and the like in a warehouse or a factory, based on a heat map of movement of the vehicle 1.

According to the first embodiment, it is possible to visualize a place where the vehicles 1 passes by each other during movement, based on differences among trajectories of the vehicles 1, and therefore, improve paths and width of passageways to improve safety.

Modified Embodiment of First Embodiment

Steps S41 to S45 of FIG. 17 may be executed in any other order. The result does not differ due to the order of steps, but the process speed varies. For example, by executing step S42 before step S44, it is possible to efficiently avoid the case where the image capturing apparatus 11 is located in front of the marker 4. In addition, only a part of the steps S41 to S45 may be executed.

Steps S24 to S25 of FIG. 11 may be executed by the corrector 36, instead of by the absolute position calculator 34. In this case, the absolute position calculator 34 always sends to the corrector 36 the absolute position and the absolute attitude calculated based on the position and attitude of the marker 4. The corrector 36 corrects the position and attitude of the vehicle 1 based on the absolute position and the absolute attitude, only when the marker 4 is reliable.

In the example described above, the corrector 36 manages the absolute position and the absolute attitude separately from the relative position and the relative attitude, without replacing the relative position and the relative attitude with the absolute position and the absolute attitude. Alternatively, the corrector 36 may replace the relative position and the relative attitude with the absolute position and the absolute attitude, and then, calculate the relative position and the relative attitude using the absolute position and the absolute attitude as a new reference position and a new reference attitude.

The image capturing apparatus 11 may be configured to generate an image of an object, and also detect distances from the image capturing apparatus 11 to points of the object. The image capturing apparatus 11 may include a depth sensor, such as an RGB-D camera, or a Time of Flight (ToF) sensor, in order to detect a distance to the object. Alternatively, the image capturing apparatus 11 may be a stereo camera including two cameras disposed apart from each other by a certain distance, in order to detect a distance to the object.

When the image capturing apparatus 11 detects the distance, the relative position calculator 32 may calculate the relative position and the relative attitude of the vehicle 1 using a well-known iterative closest point (ICP) algorithm or the like.

While the relative position calculation process of FIG. 9 using FAST and KLT trackers is described by way of example, other methods may be used. For example, feature point detection, feature point matching, or the like, using Scale Invariant Feature Transform (SIFT) or Oriented FAST and Rotated BRIEF (ORB), which are typically used for image processing, may be used.

When the marker 4 is disposed at the middle of the straight section of the passageway 101, it is expected that the absolute position and the absolute attitude can be calculated accurately. On the other hand, when the marker 4 is disposed near an intersection of the passageways 101, or near an entrance and exit of the passageways 101, the vehicle 1 does not always go straightforward near the marker 4, and therefore, errors may increase in the absolute position and the absolute attitude calculated. Therefore, some of the plurality of markers 4 may be provided as an auxiliary marker not used for calculating the absolute position and the absolute attitude (i.e., for correcting the position and the attitude). The auxiliary marker is disposed near, for example, origination or destination of the vehicle 1, or certain structures which may be other checkpoints (an entrance and exit of the warehouse 100, an intersection of the passageways 101, a specific one of the shelves 102, and the like). The auxiliary marker need not be disposed along the passageway 101, as long as the auxiliary marker can be captured from the vehicle 1. The positioning apparatus 12 can recognize that the vehicle 1 has arrived at a specific checkpoint, by detecting the auxiliary marker. In this case, a marker information table stored in the storage apparatus 35 further includes an item indicating whether or not each of the markers 4 is an auxiliary marker. In addition, in this case, the marker information table may not include information on the position and the attitude of the auxiliary marker. In addition, the marker information table may include an item indicating reliability of the absolute position and the absolute attitude calculated based on each of the markers 4, instead of the item indicating whether or not the marker 4 is an auxiliary marker.

The vehicle 1 and the server apparatus 2 may use a removable storage medium, such as an SD card, instead of the communication apparatuses 13 and 22. The position and the attitude of the vehicle calculated at the vehicle may be written to the storage medium, and the server apparatus 2 may read out the position and the attitude of the vehicle from the storage medium.

The vehicle 1 may be an unmanned cargo carrying apparatus, such as an automated guided vehicle (AGV) and a pallet transport robot. In this case, the vehicle 1 travels by controlling the drive mechanism 15 under control of the server apparatus 2.

[Advantageous Effects, Etc. of First Embodiment]

According to the first embodiment, the positioning apparatus 12 is provided with the relative position calculator 32, the storage apparatus 35, the absolute position calculator 34, and the corrector 36. The relative position calculator 32 calculates a relative position and a first attitude of a vehicle 1 indicating a relative position and a relative attitude of the vehicle 1 with respect to a reference position and a reference attitude, based on a plurality of images captured by an image capturing apparatus 11 mounted on the vehicle 1. The storage apparatus 35 stores information on identifiers, positions, and attitudes of a plurality of marker 4s disposed at predetermined positions and visually distinguishable from each other, and information on a map containing a passageway for the vehicle 1. The absolute position calculator 34 extracts one of the plurality of marker 4s from an image captured by the image capturing apparatus 11, calculates an absolute position and an absolute attitude of the vehicle 1 indicating a position and an attitude of the vehicle 1 in the map, based on a position and an attitude of the one extracted marker 4, and calculates an angle of a direction of the vehicle 1 with respect to a normal line to a plane of the one marker 4, based on a position and an attitude of the vehicle 1 in a marker coordinate system with an origin at the one marker 4. The corrector 36 corrects the relative position and the first attitude based on the absolute position and the absolute attitude to generate a corrected position and a corrected attitude of the vehicle 1. The corrector 36 generates the corrected position and the corrected attitude, not using the absolute position and the absolute attitude calculated based on the position and the attitude of the marker 4 for which the angle is not larger than a first threshold, but using the absolute position and the absolute attitude calculated based on the position and the attitude of the marker 4 for which the angle is larger than the first threshold.

Thus, the corrector 36 corrects the position and attitude of the vehicle 1 based on the position and attitude of the marker 4, only when the angle of the direction of the vehicle 1 with respect to the normal line to the plane of the one marker 4 is larger than the first threshold.

According to the first embodiment, the absolute position calculator 34 may count a number of images from which a marker 4 having a same identifier is extracted, among a plurality of images consecutively captured by the image capturing apparatus 11. In this case, the corrector 36 generates the corrected position and the corrected attitude, not using the absolute position and the absolute attitude calculated based on the position and the attitude of the marker 4 when the marker 4 having the same identifier does not appear over the number of images equal to a second threshold, but using the absolute position and the absolute attitude calculated based on the position and the attitude of the marker 4 when the marker 4 having the same identifier appears over the number of images equal to or more than the second threshold.

Thus, the corrector 36 corrects the position and attitude of the vehicle 1 based on the position and attitude of the marker 4, only when the marker 4 having the same identifier appears over the number of images equal to or more than the second threshold.

According to the first embodiment, the absolute position calculator 34 may calculate a position and an attitude of the vehicle 1 in each of a plurality of marker coordinate systems with origins at a plurality of marker 4s having a same identifier and extracted from a plurality of images consecutively captured by the image capturing apparatus 11. In this case, the corrector 36 generates the corrected position and the corrected attitude, not using the absolute position and the absolute attitude calculated based on the position and the attitude of the marker 4 when coordinates of the vehicle 1 in the marker coordinate systems do not have a same sign over a number of images equal to a third threshold, but using the absolute position and the absolute attitude calculated based on the position and the attitude of the marker 4 when coordinates of the vehicle 1 in the marker coordinate systems have a same sign over a number of images equal to or more than the third threshold.

Thus, the corrector 36 corrects the position and attitude of the vehicle 1 based on the position and attitude of the marker 4, only when coordinates of the vehicle 1 in the marker coordinate systems have a same sign over a number of images equal to or more than the third threshold.

According to the first embodiment, the absolute position calculator 34 may calculate a size of the marker 4 in the image captured by the image capturing apparatus 11. In this case, the corrector 36 generates the corrected position and the corrected attitude, not using the absolute position and the absolute attitude calculated based on the position and the attitude of the marker 4 having the size equal to or smaller than a fourth threshold, but using the absolute position and the absolute attitude calculated based on the position and the attitude of the marker 4 having the size larger than the fourth threshold.

Thus, the corrector 36 corrects the position and attitude of the vehicle 1 based on the position and attitude of the marker 4, only when the marker 4 has the size larger than the fourth threshold.

According to the first embodiment, the absolute position calculator 34 may calculate a distance from the vehicle 1 to the marker 4 based on the image captured by the image capturing apparatus 11. In this case, the corrector 36 generates the corrected position and the corrected attitude, not using the absolute position and the absolute attitude calculated based on the position and the attitude of the marker 4 when the distance from the vehicle 1 to the marker 4 is equal to or more than a fifth threshold, but using the absolute position and the absolute attitude calculated based on the position and the attitude of the marker 4 when the distance from the vehicle 1 to the marker 4 is less than the fifth threshold.

Thus, the corrector 36 corrects the position and attitude of the vehicle 1 based on the position and attitude of the marker 4, only when the distance from the vehicle 1 to the marker 4 is less than the fifth threshold.

According to the first embodiment, the positioning apparatus 12 is provided with the relative position calculator 32, the storage apparatus 35, the absolute position calculator 34, and the corrector 36. The relative position calculator 32 that calculates a relative position and a first attitude of a vehicle 1 indicating a relative position and a relative attitude of the vehicle 1 with respect to a reference position and a reference attitude, based on a plurality of images captured by an image capturing apparatus 11 mounted on the vehicle 1. The storage apparatus 35 that stores information on identifiers, positions, and attitudes of a plurality of marker 4s disposed at predetermined positions and visually distinguishable from each other, and information on a map containing a passageway for the vehicle 1. The absolute position calculator 34 that extracts one of the plurality of marker 4s from an image captured by the image capturing apparatus 11, calculates an absolute position and an absolute attitude of the vehicle 1 indicating a position and an attitude of the vehicle 1 in the map, based on a position and an attitude of the one extracted marker 4, and counts a number of images from which a marker 4 having a same identifier is extracted, among a plurality of images consecutively captured by the image capturing apparatus 11. The corrector 36 that corrects the relative position and the first attitude based on the absolute position and the absolute attitude to generate a corrected position and a corrected attitude of the vehicle 1. The corrector 36 generates the corrected position and the corrected attitude, not using the absolute position and the absolute attitude calculated based on the position and the attitude of the marker 4 when the marker 4 having the same identifier does not appear over the number of images equal to a second threshold, but using the absolute position and the absolute attitude calculated based on the position and the attitude of the marker 4 when the marker 4 having the same identifier appears over the number of images equal to or more than the second threshold.

Thus, the corrector 36 corrects the position and attitude of the vehicle 1 based on the position and attitude of the marker 4, only when the marker 4 having the same identifier appears over the number of images equal to or more than the second threshold.

According to the first embodiment, a vehicle 1 is provided with: an image capturing apparatus 11; and the positioning apparatus 12.

According to the first embodiment, the relative position and the relative attitude calculated from the feature points 41 using Visual-SLAM or the like are corrected based on the absolute position and absolute attitude calculated from the markers 4, and therefore, it is possible to accurately measure the position and the attitude of the vehicle 1. In addition, according to the first embodiment, it is possible to more accurately measure the position and attitude of the vehicle 1, by determining whether or not a recognized marker 4 is reliable, and the position and attitude of the vehicle 1 based on the absolute position and the absolute attitude only when the marker 4 is reliable.

Second Embodiment

Figure 32:
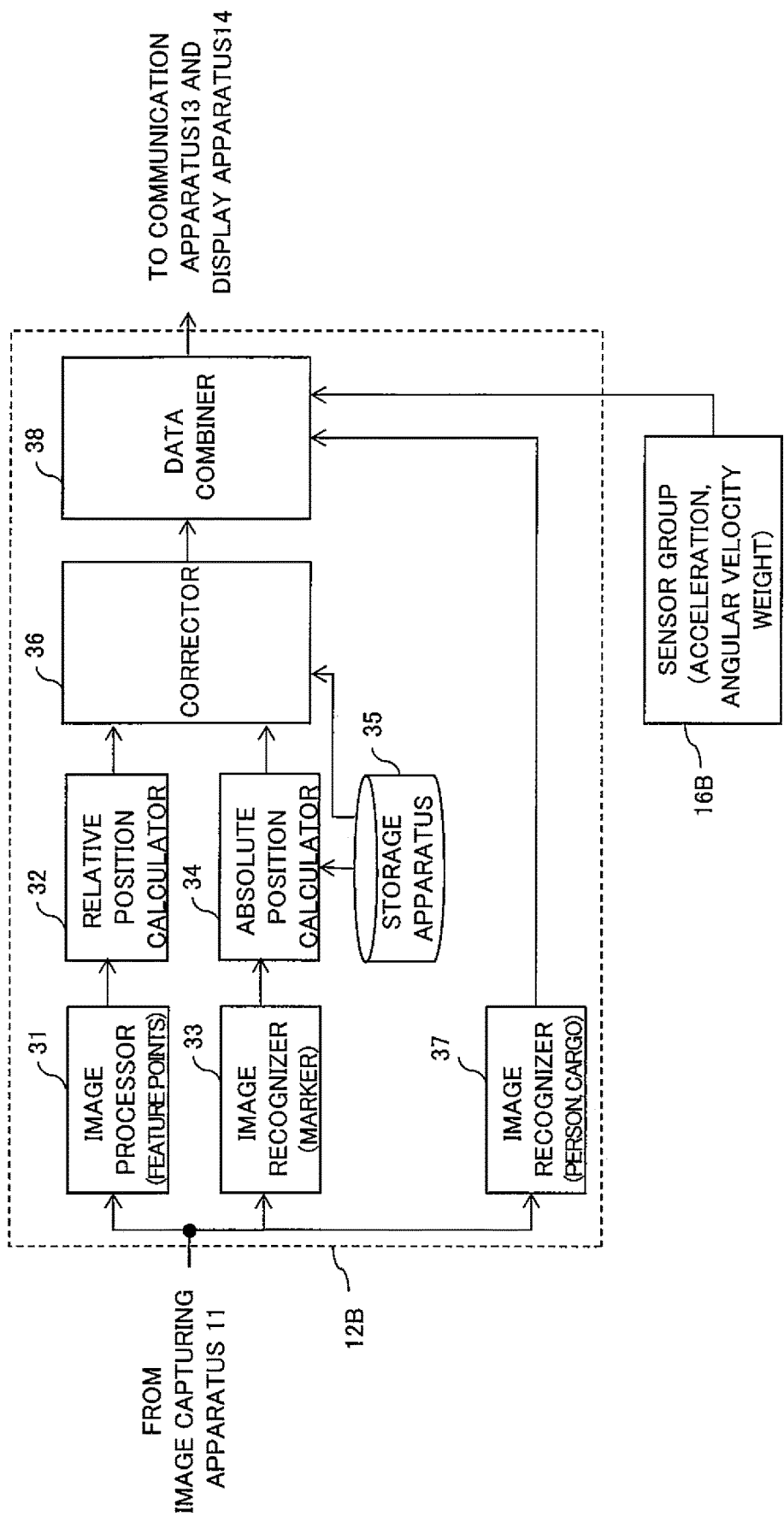
FIG. 32 is a block diagram showing a configuration of a positioning apparatus 12B according to a second embodiment.

With reference to FIG. 32, a positioning apparatus according to a second embodiment, and a moving body provided with such a positioning apparatus will be described.

[Configuration of Second Embodiment]

FIG. 32 is a block diagram showing a configuration of a positioning apparatus 12B according to a second embodiment. A vehicle 1 according to the first embodiment may be provided with a positioning apparatus 12B, instead of the positioning apparatus 12 of FIG. 3. The positioning apparatus 12B is provided with an image recognizer 37 and a data combiner 38, in addition to the components of the positioning apparatus 12 of FIG. 3.

The image recognizer 37 recognizes a predetermined target object from an image captured by the image capturing apparatus 11. The image recognizer 37 may recognize a person (for example, a driver of the vehicle 1, or a person around the vehicle 1). The image recognizer 37 may recognize specific cargo 3 learned in advance. The image processor 31, the image recognizer 33, and the image recognizer 37 may obtain images from the same image capturing apparatus 11. Alternatively, the image recognizer 37 may capture an image including a person and/or the cargo 3, using an image capturing apparatus different from the image capturing apparatus 11 for capturing images to be supplied to the image processor 31 and the image recognizer 33 (i.e., images for measuring the position and the attitude of the vehicle 1). In this case, the image capturing apparatus 11 may be provided, for example, so as to capture images of the passageway 101 in front of the vehicle 1, while the other image capturing apparatus may be provided, for example, so as to capture a driver's seat or a cargo carrier of the vehicle 1. The image capturing apparatus 11 and the other image capturing apparatus are synchronized with each other in advance.

The data combiner 38 obtains data of the corrected position and the corrected attitude of the vehicle 1 from the corrector 36, together with a timestamp indicating a time moment at which an image corresponding to the position and the attitude is captured by the image capturing apparatus 11 (or a time moment at which the position and the attitude are calculated). The data combiner 38 combines image recognition data of the target object recognized by the image recognizer 37, with the data of the position and the attitude of the vehicle 1. In addition, the data combiner 38 obtains sensor data generated by a sensor group 16B including one or more sensors mounted on the vehicle 1, and combines the sensor data with the data of the position and the attitude of the vehicle 1. The data combiner 38 may obtains sensor data including at least one of an acceleration and an angular velocity of the vehicle 1. In addition, the data combiner 38 may also obtain sensor data including a weight of the cargo 3 carried by the vehicle 1. Sensors of the sensor group 16B provide sensor data with a timestamp indicating a time moment when the sensor data is obtained. The data combiner 38 combines these data in synchronization with each other, based on the timestamp of the data of the position and the attitude of the vehicle 1, the timestamp of the image recognition data, and the timestamp of the sensor data.

When the timestamps of these data differ from each other, the data combiner 38 may associate the image recognition data or the sensor data, with the position and attitude data of the vehicle 1 having a timestamp closest to that of the image recognition data or the sensor data. In addition, when the timestamps of these data differ from each other, the data combiner 38 may interpolate the data of the position and the attitude of the vehicle 1 using linear interpolation, internal division, or the like, and associate the image recognition data or the sensor data, with the position data and the attitude data of the vehicle 1 interpolated and having a timestamp corresponding to the image recognition data or the sensor data.

Since the data combiner 38 is provided, it is possible to record various data associated with work of the vehicle 1 in association with the position and the trajectory of the vehicle 1. For example, a person associated with the work of the vehicle 1 can be tracked by recording a person recognized by image recognition. The cargo 3 carried by the vehicle 1 can be tracked by recording the cargo 3 recognized by image recognition. A rough road surface of a warehouse or the like can be detected by recording the acceleration and the angular velocity of the vehicle 1. A workload of the vehicle 1 can be monitored by recording a weight of the cargo 3.

[Advantageous Effects, Etc. Of Second Embodiment]

According to the second embodiment, the data combiner 38 may be further provided for obtaining sensor data generated by one or more sensors mounted on the vehicle 1, and combines sensor data with data of the corrected position and the corrected attitude.

According to the second embodiment, the data combiner 38 may obtain sensor data including at least one of an acceleration and an angular velocity of the vehicle 1.

According to the second embodiment, the data combiner 38 may obtain sensor data including a weight of the cargo 3 carried by the vehicle 1.

According to the second embodiment, the positioning apparatus 12B may be further provided with the image recognizer 37 that recognizes a predetermined target object from an image captured by the image capturing apparatus 11. In this case, the data combiner 38 combines information on the target object recognized by the image recognizer 37, with the data of the corrected position and the corrected attitude.

According to the second embodiment, the image recognizer 37 may recognize a person.

According to the second embodiment, the image recognizer 37 may recognize the specific cargo 3 learned in advance.

According to the second embodiment, various data associated with work of the vehicle 1 can be recorded in association with the position and the trajectory of the vehicle 1.

According to the second embodiment, the vehicle 1 may be provided with the image capturing apparatus 11 that captures images for measuring the position and the attitude of the vehicle 1, and a different image capturing apparatus that captures a further target object. In this case, the data combiner 38 can associate data of the position and the attitude data of the vehicle 1 generated based on images captured by the image capturing apparatus 11, with image recognition data generated based on the image captured by the further image capturing apparatus. When the data of the position and the attitude of the vehicle 1 is associated with the image recognition data of the different target object captured during movement of the vehicle 1, this association is considerably useful for work analysis performed based on the position and the trajectory of the vehicle 1 on the map. For example, when a person's suspicious activity is detected by visual inspection or the like, the person's position is determined on the map, and therefore, it is possible to search and retrieve an image or a video captured in the past in the vicinity of the person's position, and/or in association with the person.

Other Embodiments

In the first to third embodiments, the positioning apparatus may be provided on a four-wheel vehicle, such as a forklift or a truck, or may be provided on vehicles with one to three, five or more wheel. In addition, in the first to third embodiments, the positioning apparatus may be provided on a moving body without wheels, such as an airplane, a helicopter, a drone, and a hovercraft, regardless of the number of wheels and/or the presence/absence of wheels. The positioning apparatus according to the present embodiments can estimate a position of a moving body not based on a number of rotation of wheels, but based on an image captured by an image capturing apparatus.

According to the positioning apparatus of aspects of the present disclosure, it is possible to measure a position of a moving body in a warehouse, a factory, or the like. Accordingly, it is possible to track a trajectory (flow) of the moving body, route the moving body, optimize an arrangement of cargo or the like in a warehouse or a factory, monitor an operating rate, improving work efficiency, and the like are achievable.

The invention claimed is:

1. A moving body comprising:
  a camera that is mounted on the moving body and captures a plurality of images;
  a storage apparatus; and
  a circuit,
  wherein the storage apparatus stores information on identifiers, positions, and attitudes of a plurality of markers disposed at predetermined positions and visually distinguishable from each other, and information on a map containing a passageway for the moving body,
  wherein the circuit performs:
    calculating a first position and a first attitude of the moving body indicating a relative position and a relative attitude of the moving body with respect to a reference position and a reference attitude, based on the plurality of images captured by the camera, using Simultaneous Localization and Mapping (SLAM);
    extracting one of the plurality of markers from an image captured by the camera, calculating a second position and a second attitude of the moving body indicating a position and an attitude of the moving body in the map, based on a position and an attitude of the one extracted marker, and calculating an angle of a direction of the camera with respect to a normal line to a plane of the one marker, based on a position and an attitude of the moving body in a marker coordinate system with an origin at the one marker; and
    correcting the first position and the first attitude based on the second position and the second attitude to generate a third position and a third attitude of the moving body,
  wherein the circuit further determines, based on the calculated angle, whether or not to correct the first position and the first attitude based on the second position and the second attitude, such that:
    when the calculated angle is not larger than a first threshold, the circuit does not correct the first position and the first attitude based on the second position and the second attitude, and generates the first position and the first attitude as the third position and the third attitude; and
    when the calculated angle is larger than a first threshold, the circuit corrects the first position and the first attitude based on the second position and the second attitude to generate the third position and the third attitude, and
  wherein the circuit further performs recording a trajectory of the moving body.

2. The moving body of claim 1,
  wherein the circuit further counts a number of images from which a marker having a same identifier is extracted, among a plurality of images consecutively captured by the camera, and
  wherein, when the marker having the same identifier does not appear over the number of images equal to a second threshold, the circuit does not correct the first position and the first attitude based on the second position and the second attitude, and generates the first position and the first attitude as the third position and the third attitude, and when the marker having the same identifier appears over the number of images equal to or more than the second threshold, the circuit corrects the first position and the first attitude based on the second position and the second attitude to generate the third position and the third attitude.

3. The moving body of claim 1,
  wherein the circuit further calculates a position and an attitude of the moving body in each of a plurality of marker coordinate systems with origins at a plurality of markers having a same identifier and extracted from a plurality of images consecutively captured by the camera, and wherein, when coordinates of the moving body in the marker coordinate systems do not have a same sign over a number of images equal to a third threshold, the circuit does not correct the first position and the first attitude based on the second position and the second attitude, and generates the first position and the first attitude as the third position and the third attitude, when coordinates of the moving body in the marker coordinate systems have a same sign over a number of images equal to or more than the third threshold, the circuit corrects the first position and the first attitude based on the second position and the second attitude to generate the third position and the third attitude.

4. The moving body of claim 1,
wherein the circuit further calculates a size of the marker in the image captured by the camera, and
wherein, when the marker has the size equal to or smaller than a fourth threshold, the circuit does not correct the first position and the first attitude based on the second position and the second attitude, and generates the first position and the first attitude as the third position and the third attitude, when the marker has the size larger than the fourth threshold, the circuit corrects the first position and the first attitude based on the second position and the second attitude to generate the third position and the third attitude.

5. The moving body of claim 1,
wherein the circuit further calculates a distance from the moving body to the marker based on the image captured by the camera, and
wherein, when the distance from the moving body to the marker is equal to or more than a fifth threshold, the circuit does not correct the first position and the first attitude based on the second position and the second attitude, and generates the first position and the first attitude as the third position and the third attitude, when the distance from the moving body to the marker is less than the fifth threshold, the circuit corrects the first position and the first attitude based on the second position and the second attitude to generate the third position and the third attitude.

6. The moving body of claim 1,
wherein the circuit further obtains sensor data generated by one or more sensors mounted on the moving body, and combines data of the third position and the third attitude, with the sensor data.

7. The moving body of claim 6,
wherein the circuit obtains sensor data including at least one of an acceleration and an angular velocity of the moving body.

8. The moving body of claim 6,
wherein the circuit obtains sensor data including a weight of cargo carried by the moving body.

9. The moving body of claim 6,
wherein the circuit further recognizes a predetermined target object from an image captured by the camera, and
wherein the circuit combines the data of the third position and the third attitude, with information on the recognized target object.

10. The moving body of claim 9,
wherein the circuit recognizes a person.

11. The moving body of claim 9,
wherein the circuit recognizes specific cargo learned in advance.

12. The moving body of claim 1,
wherein the circuit generates the third position and the third attitude, based on the first position and the first attitude, and based on the second position and the second attitude calculated from the image identical to the image from which the first position and the first attitude are calculated.

13. The moving body of claim 1,
wherein the moving body is a vehicle.

14. The moving body of claim 1,
wherein the circuit further performs determining whether or not the one marker is reliable, and
the circuit determines that that the one marker is not reliable when the calculated angle is not larger than a first threshold.

15. A moving body monitoring system comprising
a moving body;
a camera that captures a plurality of images;
a storage apparatus; and
a server apparatus comprising a circuit,
wherein the storage apparatus stores information on identifiers, positions, and attitudes of a plurality of markers disposed at predetermined positions and visually distinguishable from each other, and information on a map containing a passageway for the moving body,
wherein the circuit performs:
calculating a first position and a first attitude of the moving body indicating a relative position and a relative attitude of the moving body with respect to a reference position and a reference attitude, based on the plurality of images captured by the camera, using Simultaneous Localization and Mapping (SLAM);
extracting one of the plurality of markers from an image captured by the camera, calculating a second position and a second attitude of the moving body indicating a position and an attitude of the moving body in the map, based on a position and an attitude of the one extracted marker, and calculating an angle of a direction of the camera with respect to a normal line to a plane of the one marker, based on a position and an attitude of the moving body in a marker coordinate system with an origin at the one marker; and
correcting the first position and the first attitude based on the second position and the second attitude to generate a third position and a third attitude of the moving body,
wherein the circuit further determines, based on the calculated angle, whether or not to correct the first position and the first attitude based on the second position and the second attitude, such that:
when the calculated angle is not larger than a first threshold, the circuit does not correct the first position and the first attitude based on the second position and the second attitude, and generates the first position and the first attitude as the third position and the third attitude; and
when the calculated angle is larger than a first threshold, the circuit corrects the first position and the first attitude based on the second position and the second attitude to generate the third position and the third attitude, and
wherein the circuit further performs recording a trajectory of the moving body.

16. A computer-implemented method for automatically generating a trajectory of a moving body, the method comprising:

receiving information on identifiers, positions, and attitudes of a plurality of markers disposed at predetermined positions and visually distinguishable from each other, and information on a map containing a passageway for the moving body, calculating a first position and a first attitude of the moving body indicating a relative position and a relative attitude of the moving body with respect to a reference position and a reference attitude, based on the plurality of images captured by a camera, using Simultaneous Localization and Mapping (SLAM);

extracting one of the plurality of markers from an image captured by the camera, calculating a second position and a second attitude of the moving body indicating a position and an attitude of the moving body in the map, based on a position and an attitude of the one extracted marker, and calculating an angle of a direction of the camera with respect to a normal line to a plane of the one marker, based on a position and an attitude of the moving body in a marker coordinate system with an origin at the one marker;

correcting the first position and the first attitude based on the second position and the second attitude to generate a third position and a third attitude of the moving body, wherein the method further comprises determining, based on the calculated angle, whether or not to correct the first position and the first attitude based on the second position and the second attitude, such that:

when the calculated angle is not larger than a first threshold, the first position and the first attitude are not corrected based on the second position and the second attitude, and the first position and the first attitude are generated as the third position and the third attitude; and when the calculated angle is larger than a first threshold, the first position and the first attitude are corrected based on the second position and the second attitude to generate the third position and the third attitude, and; wherein the method further comprises recording a trajectory of the moving body.

* * * * *